US007657035B2

(12) United States Patent
Yato et al.

(10) Patent No.: US 7,657,035 B2
(45) Date of Patent: Feb. 2, 2010

(54) ENCRYPTION COMMUNICATION METHOD AND SYSTEM

(75) Inventors: Akifumi Yato, Kawasaki (JP); Tadashi Kaji, Yokohama (JP); Osamu Takata, Tokyo (JP); Takahiro Fujishiro, Yokohama (JP); Kazuyoshi Hoshino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 707 days.

(21) Appl. No.: 11/504,767

(22) Filed: Aug. 16, 2006

(65) Prior Publication Data

US 2007/0192587 A1 Aug. 16, 2007

(30) Foreign Application Priority Data

Feb. 3, 2006 (JP) ............................ 2006-026492

(51) Int. Cl.
*H04L 9/00* (2006.01)
*H04L 29/06* (2006.01)

(52) U.S. Cl. ...................................... 380/277; 713/155

(58) Field of Classification Search ................ 380/277; 713/155

See application file for complete search history.

(56) References Cited

U.S. PATENT DOCUMENTS

| | | | | |
|---|---|---|---|---|
| 6,094,487 | A * | 7/2000 | Butler et al. | 380/270 |
| 6,611,194 | B1 * | 8/2003 | Vieweg et al. | 340/5.2 |
| 6,976,176 | B1 * | 12/2005 | Schier | 726/11 |
| 7,110,548 | B1 * | 9/2006 | Ougi et al. | 380/278 |
| 7,203,957 | B2 * | 4/2007 | Balissat et al. | 726/15 |
| 7,272,230 | B2 * | 9/2007 | Sasaki | 380/278 |
| 7,334,125 | B1 * | 2/2008 | Pellacuru | 713/163 |
| 2005/0226424 | A1 * | 10/2005 | Takata et al. | 380/279 |

FOREIGN PATENT DOCUMENTS

| | | |
|---|---|---|
| JP | 2005-303485 | 10/2005 |
| JP | 2005-304093 | 10/2005 |

OTHER PUBLICATIONS

Tadashi Kaji et al. "A Model for Establishing Secure Communication in Secure Service Platform" Hitachi Ltd.

Tadashi Kaji et al. "A Model for Establishing Secure Communication Using Trusted Third Party Services" Hitachi Ltd. (Extended Abstract).

* cited by examiner

*Primary Examiner*—Matthew B Smithers
*Assistant Examiner*—Ali S Abyaneh
(74) *Attorney, Agent, or Firm*—McDermott Will & Emery LLP

(57) ABSTRACT

Each terminal registers the key generation information into each session management server, the information including a plurality of setting items necessary for determining set values to generated a key to be used by itself, and set value candidates which are stored in the setting items.

When the encryption communications are established between the terminals, the individual session management servers and a key generation information management server are associated, so that the key generation information management server selects the algorithm suite based on the key generation information. The session management server generates the parameters based on the selected algorithm suite, acquires the information on the selected algorithm suite from the key generation information management server, generates the key for the encryption communications based on that information and distributes the key to the each terminal.

15 Claims, 15 Drawing Sheets

```
REGISTER sip:domain1.hitachi.co.jp SIP/2.0
To: sip:client1@domain1.hitachi.co.jp
From: [sip:client1@domain1.hitachi.co.jp] ; tag=1004329468
......
<-- BODY PORTION OF SIP MESSAGE -->
......
```

ID304

LOG-IN PROCESSING REQUEST 2000

```
SIP/2.0 200 OK
To: sip:client1@domain1.hitachi.co.jp
From: sip:client1@domain1.hitachi.co.jp ; tag=1004329468
Cseq: 1 REGISTER
......
```

LOG-IN PROCESSING RESPONSE 2500

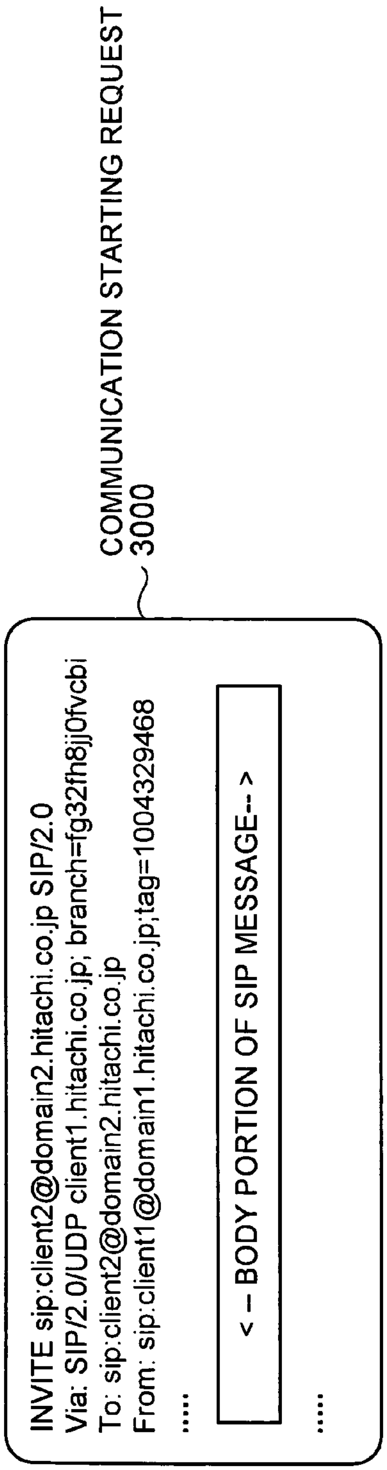

FIG.8A

COMMUNICATION STARTING REQUEST
3000

INVITE sip:client2@domain2.hitachi.co.jp SIP/2.0
Via: SIP/2.0/UDP client1.hitachi.co.jp; branch=fg32fh8jj0fvcbi
To: sip:client2@domain2.hitachi.co.jp
From: sip:client1@domain1.hitachi.co.jp;tag=1004329468
...

<-- BODY PORTION OF SIP MESSAGE-->

...

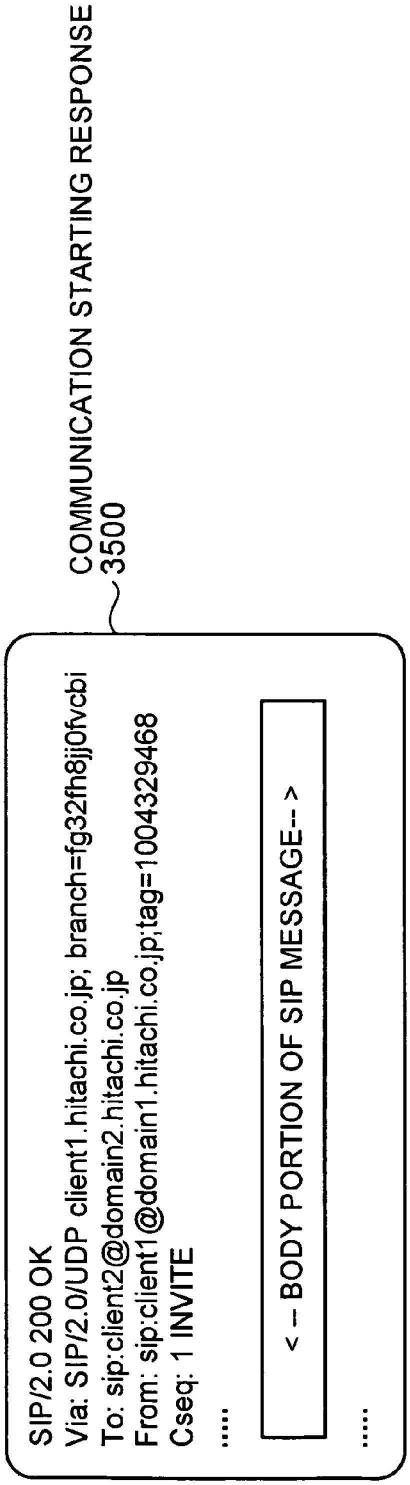

FIG.8B

COMMUNICATION STARTING RESPONSE
3500

SIP/2.0 200 OK
Via: SIP/2.0/UDP client1.hitachi.co.jp; branch=fg32fh8jj0fvcbi
To: sip:client2@domain2.hitachi.co.jp
From: sip:client1@domain1.hitachi.co.jp;tag=1004329468
Cseq: 1 INVITE
...

<-- BODY PORTION OF SIP MESSAGE-->

...

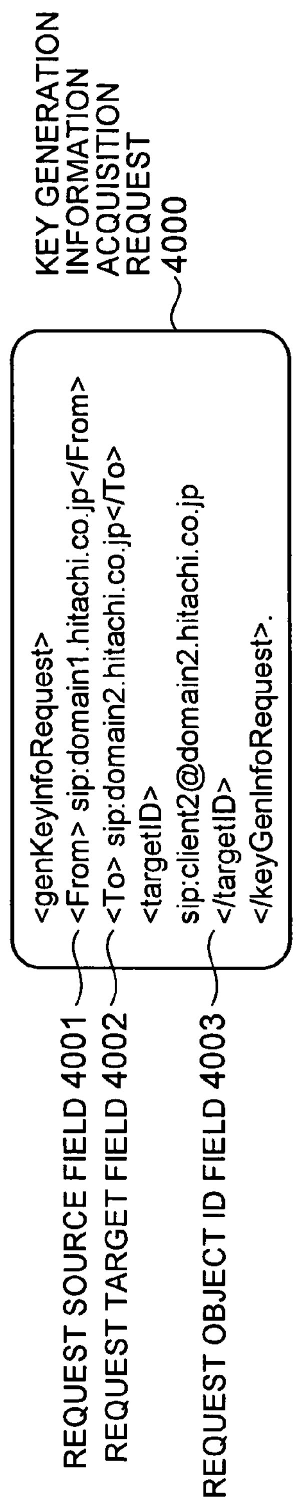

FIG. 9A

KEY GENERATION
INFORMATION
ACQUISITION
REQUEST
4000

```
<genKeyInfoRequest>
  <From> sip:domain1.hitachi.co.jp</From>
  <To> sip:domain2.hitachi.co.jp</To>
  <targetID>
    sip:client2@domain2.hitachi.co.jp
  </targetID>
</keyGenInfoRequest>.
```

REQUEST SOURCE FIELD 4001
REQUEST TARGET FIELD 4002
REQUEST OBJECT ID FIELD 4003

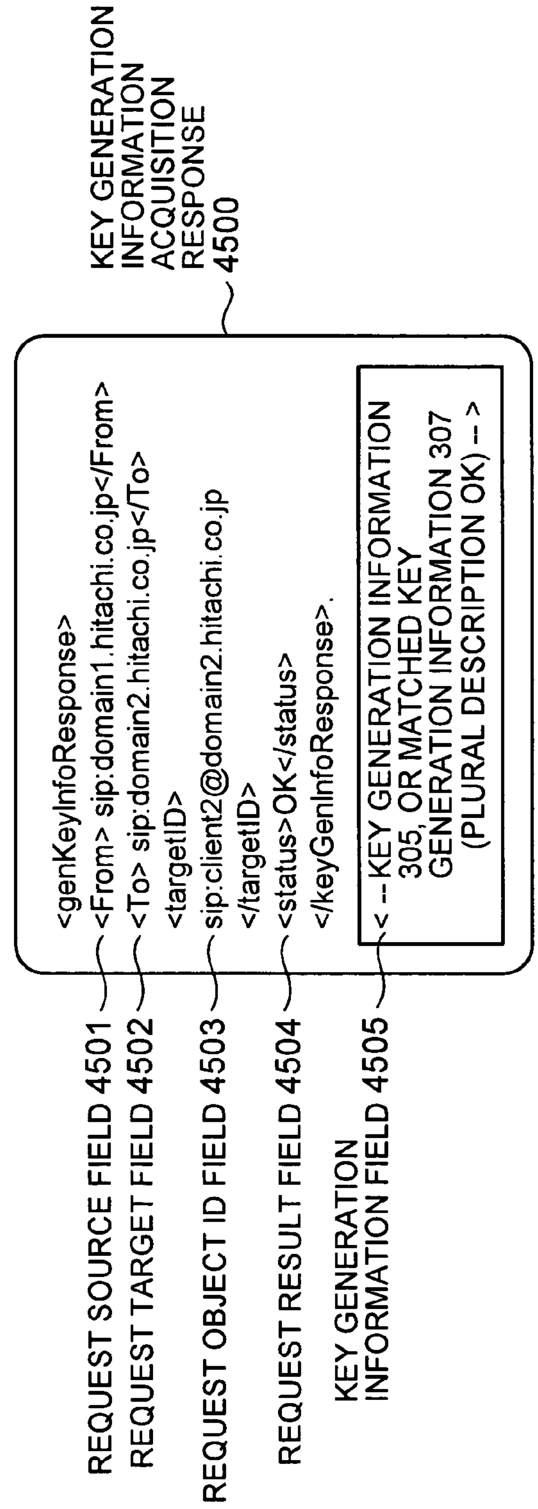

FIG. 9B

KEY GENERATION
INFORMATION
ACQUISITION
RESPONSE
4500

```
<genKeyInfoResponse>
  <From> sip:domain1.hitachi.co.jp</From>
  <To> sip:domain2.hitachi.co.jp</To>
  <targetID>
    sip:client2@domain2.hitachi.co.jp
  </targetID>
  <status>OK</status>
</keyGenInfoResponse>.
<!-- KEY GENERATION INFORMATION
305, OR MATCHED KEY
GENERATION INFORMATION 307
(PLURAL DESCRIPTION OK) -->
```

REQUEST SOURCE FIELD 4501
REQUEST TARGET FIELD 4502
REQUEST OBJECT ID FIELD 4503
REQUEST RESULT FIELD 4504
KEY GENERATION
INFORMATION FIELD 4505

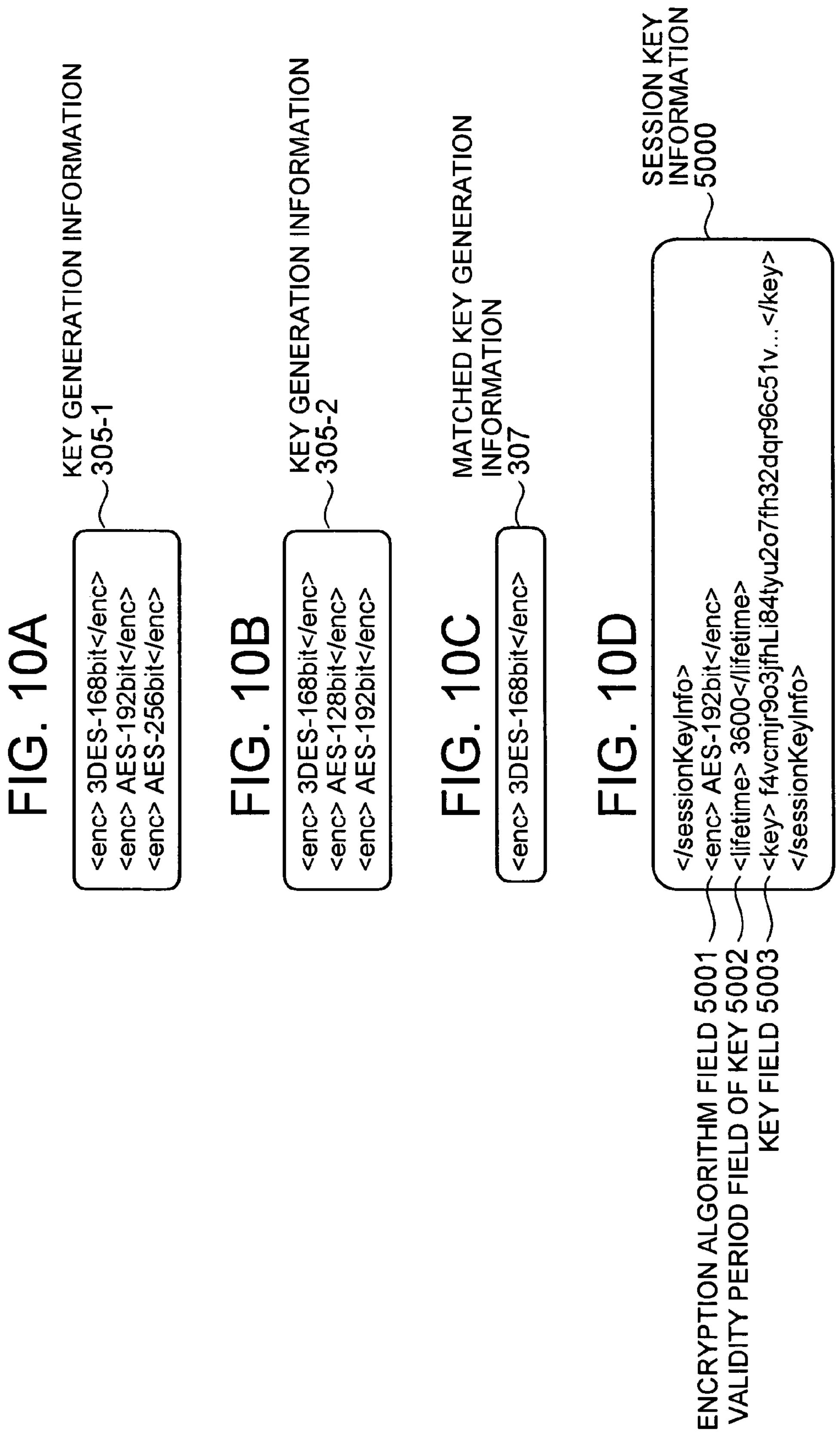

FIG. 10A
<enc> 3DES-168bit</enc>
<enc> AES-192bit</enc>
<enc> AES-256bit</enc>
KEY GENERATION INFORMATION 305-1
FIG. 10B
<enc> 3DES-168bit</enc>
<enc> AES-128bit</enc>
<enc> AES-192bit</enc>
KEY GENERATION INFORMATION 305-2
FIG. 10C
<enc> 3DES-168bit</enc>
MATCHED KEY GENERATION INFORMATION 307
FIG. 10D
</sessionKeyInfo>
<enc> AES-192bit</enc>
<lifetime> 3600</lifetime>
<key> f4vcmjr9o3jfhLi84tyu2o7fh32dqr96c51v...</key>
</sessionKeyInfo>
SESSION KEY INFORMATION 5000
ENCRYPTION ALGORITHM FIELD 5001
VALIDITY PERIOD FIELD OF KEY 5002
KEY FIELD 5003

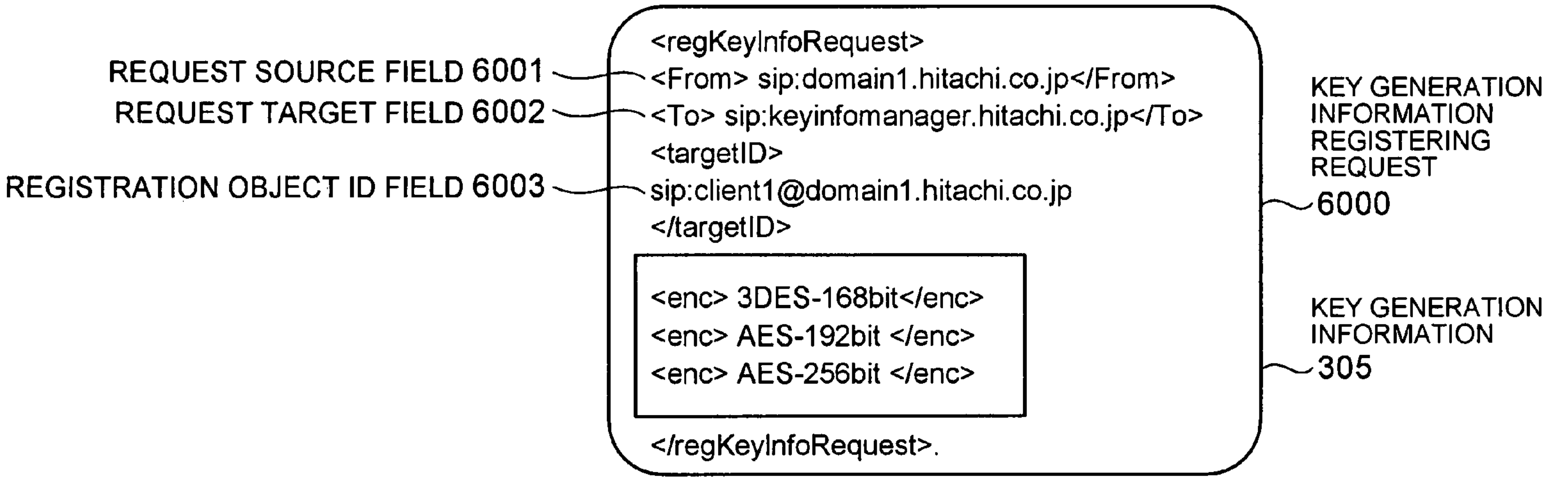

FIG. 15A

KEY GENERATION INFORMATION REGISTERING REQUEST 6000

KEY GENERATION INFORMATION 305

```
<regKeyInfoRequest>
<From> sip:domain1.hitachi.co.jp</From>
<To> sip:keyinfomanager.hitachi.co.jp</To>
<targetID>
sip:client1@domain1.hitachi.co.jp
</targetID>

  <enc> 3DES-168bit</enc>
  <enc> AES-192bit </enc>
  <enc> AES-256bit </enc>

</regKeyInfoRequest>.
```

REQUEST SOURCE FIELD 6001
REQUEST TARGET FIELD 6002
REGISTRATION OBJECT ID FIELD 6003

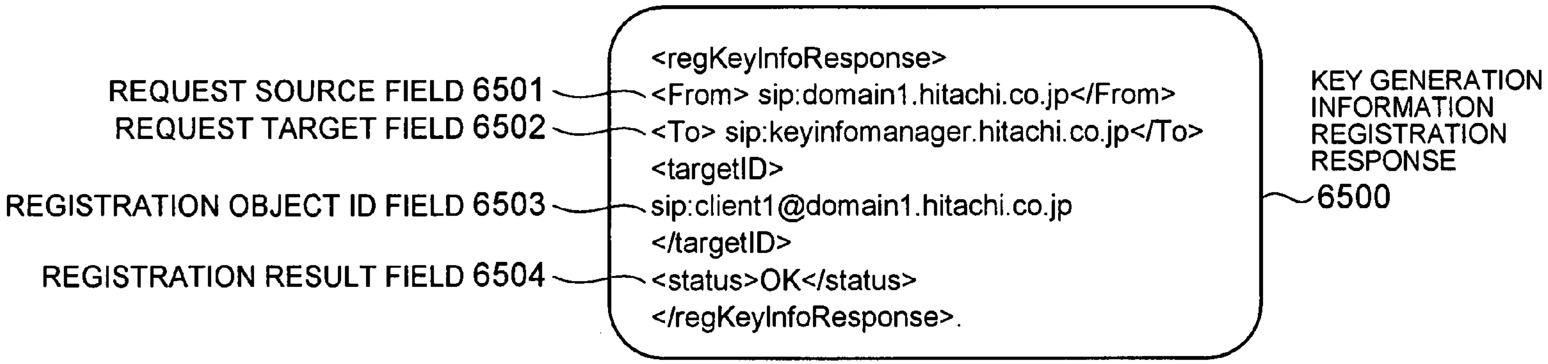

FIG. 15B

KEY GENERATION INFORMATION REGISTRATION RESPONSE 6500

```
<regKeyInfoResponse>
<From> sip:domain1.hitachi.co.jp</From>
<To> sip:keyinfomanager.hitachi.co.jp</To>
<targetID>
sip:client1@domain1.hitachi.co.jp
</targetID>
<status>OK</status>
</regKeyInfoResponse>.
```

REQUEST SOURCE FIELD 6501
REQUEST TARGET FIELD 6502
REGISTRATION OBJECT ID FIELD 6503
REGISTRATION RESULT FIELD 6504

ENCRYPTION COMMUNICATION METHOD AND SYSTEM

INCORPORATION BY REFERENCE

This application claims priority based on a Japanese patent application, No. 2006-026492 filed on Feb. 3, 2006, the entire contents of which are incorporated herein by reference.

BACKGROUND OF THE INVENTION

The present invention relates to an encryption communication method and system through a plurality of session management servers.

In recent years, troubles frequently occur with the use of the Internet, such as leakage of private information of the user or arrival of unknown bills, so that the use of the network increases anxiety. As a result, demands for security on the network and in communications have increased, and many security countermeasures have been taken, such as application of security patches, updating of virus defining files, or access controls on service users. Because of the increase insecurity countermeasures, however, networkusers have found it difficult to adequately implement these security countermeasures. Thus, most countermeasures are implemented in facilities (e.g., ISP facilities) provided by a third party.

One security countermeasure implemented in facilities provided by a third party is the establishment of interposing encryption communication. In one method a trusted third party (TTP) establishes encryption communication between network terminals (referred to below as "terminals") (described in "Secure Communication Establishment Model in Secure Service Platforms", Kaji et al., Information Processing Society of Japan, Research Report 2005-CSEC-028, Vol. 2005, No. 33, pp. 151-156 (2005) (referred to as "Document 1")).

Document 1 discloses that the algorithm for the encryption communications or the parameters necessary for generating key are decided by the TTP in place of the terminals.

Specifically, the algorithm to be used for the encryption communications between a terminal 1 and a terminal 2 and the parameter necessary for generating a key are determined by the TTP in the following manner.

First of all, the TTP collects in advance information such as the encryption algorithm or a hash algorithm, which can be used by the terminal 1 and the terminal 2.

Next, the terminal 1 sends a communication request for the terminal 2 to the TTP. The TTP compares, when it receives the communication request from the terminal 1 to the terminal 2, an algorithm to be used by the terminal 1 and an algorithm to be used by the terminal 2. On the basis of a predetermined policy, the terminal 1 and the terminal 2 determine the algorithm and the parameter to be used for the encryption communications. The TTP distributes the determined algorithm and parameter respectively to the terminal 1 and the terminal 2, for sharing.

After this, the terminal 1 and the terminal 2 utilize the distributed information to perform the encryption communications, but not through the TTP.

Since the encryption communications are established through the TTP, the method thus far described is characterized in that the terminals are released from operations to determine the parameters necessary for generating the algorithm and the key to be used for the encryption communications.

SUMMARY OF THE INVENTION

In cases of using the aforementioned encryption communication method, one server device (referred to below as the session management server) having TTP functions does not intervene in any of the encryption communications, but a plurality of session management servers may be associated to establish the encryption communications.

When a number of terminals capable of accessing an in-house LAN establish the encryption communications by utilizing the aforementioned encryption communication method, the session management servers have to perform many operations to determine the parameters necessary for generating the algorithm or key to be used for the encryption communications, so that the processing load on the session management servers increases. One solution to this problem is to prepare a plurality of session management servers in a company so as to reduce the number of terminals to be managed by one session management server. In order to establish the encryption communications between the terminals managed by the different session management servers, the encryption communications have to be established through the two session management servers.

In cases in which an ISP (Internet Service Provider) manages the terminals of contracted users, there may occur situations in which the encryption communications are to be done between terminals contracted to different ISPs. In such cases, the encryption communications between the terminals have to be established through session management servers of the ISP to which those terminals are affiliated.

In all cases, however, since plural session management servers are provided, the following problems occur when parameters necessary for generating the algorithm or the key to be used in the encryption communication are determined.

Specifically, the session management server 1 collects information such as the encryption algorithm or hash algorithm to be used by the terminal 1, and the session management server 2 collects information such as the encryption algorithm or hash algorithm to be used by the terminal 2. In this case, the information such as the encryption algorithm or hash algorithm, which can be used by the terminal sand in which the information of the algorithms to be compared is described, are distributed among the different session management servers. In cases in which the encryption communication is to be established between the terminal 1 and the terminal 2, there arises a problem in that it is difficult to determine the parameters necessary for generating the algorithm and key to be used in the encryption communications. However, this problem is not described in Document 1.

The present invention provides means which realizes encryption communications between terminals while solving the aforementioned problems.

Specifically, in session management servers that are different for different terminals that perform the encryption communications using the session key, information (referred to below as the key generation information) is registered that is composed of a plurality of setting items which must be determined for generating a session key used by its own terminal and which has set value candidates for each setting item. The encryption communication system of the invention is mainly distinguished by comprising means which selects an algorithm suite to be used for the encryption communication by associating each session management server when the encryption communications are established not going through the session management server.

Here, the settings of a bulk encryption algorithm, a key length, an operation mode, a padding algorithm and so on are collectively called the "algorithm suite", as described above.

Specifically, the invention is provided with the means or device such as the key generation information management server for selecting the algorithm suite on the basis of the predetermined policy, which can be utilized by both the terminals on the basis of the key generation information of each terminal managed by each session management server, when the encryption communication is established between the terminals.

Moreover, the device, which has the means for generating the key parameters on the basis of the selected algorithm suite, is provided with a means which acquires information on the selected algorithm suite from the key generation information management server.

Here, the key generation information management server may be an independent device different from the session management server or the same device as either session management server.

Moreover, the device which has the means for generating the key parameters may be an independent device different from the key generation information management server or the session management server, or may be the same device as the key generation information management server or the session management server.

The setting items to be described in the key generation information of each terminal can be exemplified by the setting items of the encryption algorithm suite which can be used for the encryption communication by the terminal, setting items of a message digest algorithm suite, or setting items of a message authenticated algorithm suite.

The setting items, as exemplified above, of the encryption algorithm suite can be the name of the encryption algorithm, the period of validity or length of the key used for the encrypting processing, the maximum data size to be processed by the key, the period of validity or length of the key used for decryption processing, the usage mode, or the name of the algorithm used for the padding. Moreover, the setting items of the message digest algorithm suite can be described by the name of the message digest algorithm. Moreover, the setting items of the message authentication algorithm suite can be the name of the message authentication algorithm, the period of validity or length of the key used for the message authentication processing, the maximum data size to be processed by the key. In addition, other setting items may be added to the key generation information.

According to the invention, even in cases in which the encryption communications are to be established between terminals of different log-in session management servers and through the plural session management servers, it is possible to generate the parameters necessary for selecting the algorithm suite used for the encryption communication and for generating the key. After this, the encryption communications can be done through the terminals, without going through the session management server.

These and other benefits are described throughout the present specification. A further understanding of the nature and advantages of the invention may be realized by reference to the remaining portions of the specification and the attached drawings.

BRIEF DESCRIPTION OF THE DRAWINGS

FIGS. 8A and 8B exemplify data configuration of a communication starting request 3000 and a communication starting response 3500;

FIGS. 9A and 9B exemplify data configuration of a key generation information acquisition request 4000 and a key generation information acquisition response 4500;

FIGS. 10A to 10D exemplify data configuration of the key generation information 305-1, the key generation information 305-2, matched key generation information 307 and session key information 5000;

FIGS. 15A and 15B exemplify data of a key generation information registration request 6000 and a key generation information registration response 6500.

DETAILED DESCRIPTION OF THE EMBODIMENTS

Modes of embodiment of the invention are described in detail with reference to the accompanying drawings. In cases in which a plurality of components of the same kind appear in an embodiment, they are designated by using hyphenated numbers such as a session management server 100-1 and a session management server 100-2. In cases in which components of the same kind are described collectively, no hyphenation is used, for example, the session management server 100-1 and the session management server 100-2, are expressed collectively as a session management server 100.

In Embodiment 1 and Embodiment 2 of the invention information composed of a plurality of setting items needed for the determination of set values for generating a session key to be used by the an individual terminal, the information storing set value candidates for the various setting items, is referred to as the key generation information.

Moreover, examining whether or not the common set value for generating the session key exists in each setting item of the key generation information of two terminals for executing the encryption communication, is referred to as matching of the key generation information. Moreover, the information, which describes each setting value in the algorithm suite selected by the matching of the key generation information is called the matched key generation information.

The information which is composed of the algorithm suite selected by the matching, and the session key, the period of validity of the key and the key length, generated by the session management server on the basis of the set value described in the matched key generation information , is called session key information.

Moreover, the registration by the terminal of its own ID in the session management server is referred to as the terminal logging in to the session management server.

Embodiment 1

Embodiment 1 describes the encryption communication system using a SIP (Session Initiation Protocol) according to the invention. The SIP is the communication protocol for managing or controlling the communication session, as defined by RFC3261 in IETF.

Figure 1:
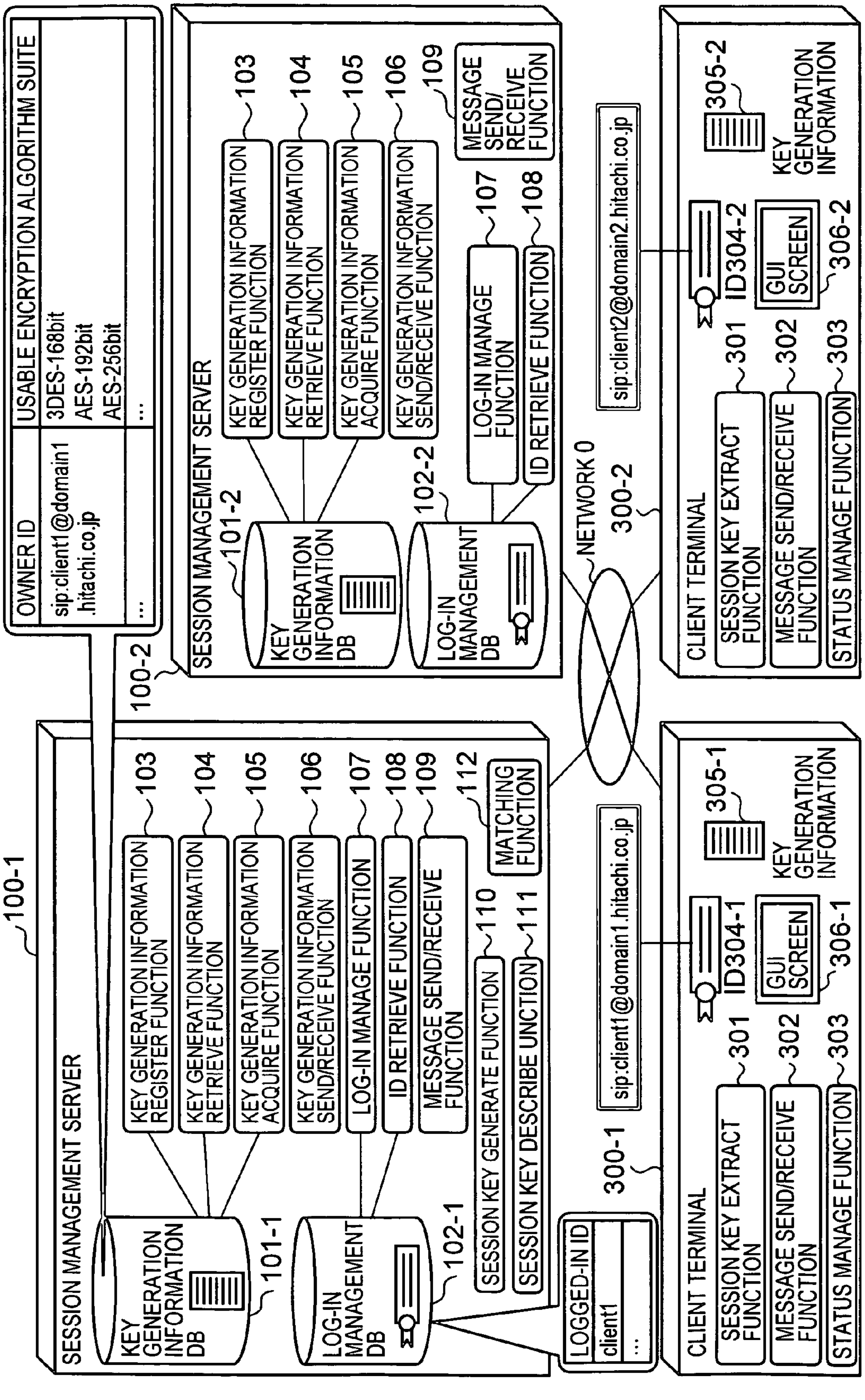
FIG. 1 exemplifies the individual configuration components and the functional information of an encryption communication system of Embodiment 1.

FIG. 1 is a configuration diagram of an encryption communication system of Embodiment 1. In FIG. 1, the encryption communication system is configured to include a session management server 100-1, a session management server 100-2, a client terminal (referred to below as a terminal) 300-1, and a terminal 300-2. These individual components are connected with each other via a network 0. Moreover, the session management server 100 is provided with a key generation information database 101 (referred to below as DB), and log-in management DB 102.

In Embodiment 1, the terminal 300-1 and the terminal 300-2 share, when performing encryption communications, a session key for the encryption communication by the SIP communication through the session management server 100-1 and the session management server 100-2. At this time, the session management server 100-1 selects, by the matching of the key generation information of the terminal 300-1 and the terminal 300-2, the algorithm suite to be used for the encryption communication between the terminal 300-1 and the terminal 300-2, and generates session key information 5000 on the basis of the set value described in the matched key generation information. The session key information 5000 is distributed to the terminal 300-1 and the terminal 300-2, so that these terminals 300-1 and 300-2 start the encryption communication with the distributed session key information 5000 but not through the session management server 100-1 or the session management server 100-2.

The encryption communication, to which Embodiment 1 is applied, can be applied not only to P2P communication between terminals but also to client/server communication between terminals and a business server. Another application is communication between communication devices such as routers or between business servers.

On the other hand, the network 0 maybe a private network such as an in-house LAN or an open network such as the Internet.

Moreover, the key generation information DB101 and the log-in management DB102 can be configured as devices contained in the session management server 100, as in Embodiment 1. However, each DB may be configured as a device other than the session management server 100, and the DB and the session management server 100 may be connected via the network.

The terminal 300 is a device for encryption communications with another terminal 300. The terminal 300 is provided with: a session key extract function 301 to extract the session key information 5000 described in those messages, when it receives a communication starting request 3000 or a communication starting response 3500 from the session management server 100; a message send/receive function 302 to send/receive the messages with the session management server 100; and a status manage function 303 to manage non-logged-in status, logged-in status, communicable status and communication reception status that the internal status of the terminal 300 has. Moreover, the terminal 300 stores the ID 304 of the terminal 300 and key generation information 305 describing a list of encryption algorithm suite candidates that can be used by the terminal 300, and is provided with a GUI screen 306 for displaying the internal status of the terminal 300.

In Embodiment 1, the ID304 of the terminal 300 is expressed as an SIP entity character string, referred to as SIP-URI. The SIP-URI of the terminal 300 is a character string, in which the name of the terminal 300 and the name of the session management server 100 to be logged in by the terminal 300 are connected by "@", and to the head of which "sip:" is added.

Specifically, the name of the terminal 300-1 is "client1", and the session management server 100-1, in which the terminal 300-1 is logged, is named "domain1.hitachi.co.jp", so that the terminal 300-1 has an ID304-1 of "sip:client1@domain1.hitachi.co.jp". Likewise, the terminal 300-2 is named "client2", and the session management server 100-2, in which the terminal 300-2 is logged, is named "domain2.hitachi.co.jp", so that the terminal 300-2 has an ID304-2 of "sip:client2@domain2.hitachi.co.jp".

In Embodiment 1, the setting item of the encryption algorithm suite, which needs the decision of the set value for generating the session key used by the terminal 300, is so described in the key generation information 305 that it is sandwiched by the enc tag of XML. The element of the enc tag designates the candidate of the encryption algorithm suite which can be used by the terminal 300. In this embodiment, the candidate of the encryption algorithm suite describes the character string, in which the name and the key length of the encryption algorithm are connected by "-", as the algorithm suite name. In cases where "AES-256bit" is described in the key generation information 305 as the algorithm suite to be used by the terminal 300, "AES-256bit" means that the encryption algorithm to be used by the terminal 300 is AESand that the key of 256 bits can be used.

Here, the key generation information 305 may describe not only the setting items of the encryption algorithm suite but also the setting items of the message digest algorithm suite and the setting items of the message authentication algorithm suite in the XML format.

The setting items of the encryption algorithm suite may contain not only the name of the encryption algorithm, the length of the key to be used for encryption/decryption, but also the validity period of that key, the maximum data size to be processed by the key, the usage mode, the name of the algorithm used for padding, and so on.

Moreover, the setting items of the message digest algorithm suite may also contain the name or the like of the message digest algorithm. Moreover, the setting items of the message authentication algorithm suite may further contain the name of the message authentication algorithm, the length of the key to be used for the message authentication processing, the validity period, and the maximum data size to be processed with that key.

Alternatively, the key generation information 305 may describe not the name of the algorithm suite such as the "3DES-168bit" as the candidate of the algorithm suite but the setting items of the algorithm suite individually.

In a key generation information 305-1, as shown in FIG. 10A, "3DES-168bit", "AES-192bit" and "AES-256bit" are described as the encryption algorithm suite candidates which can be used by the terminal 300. In key generation information 305-2, as shown in FIG. 10B, on the other hand, "3DES-168bit", "AES-128bit" and "AES-192bit" are described as the encryption algorithm suite candidates which can be used by the terminal 300.

The key generation information management DB101 is the DB for registering the pair of the ID304 and the key generation information 305 of the terminal 300. On the other hand, the log-in management DB102 is a DB for registering the ID304 of the logged-interminal 300 in the session management server 100.

The session management server 100 is a device for controlling the encryption communications of the terminal 300 which is logged in to that server 100. The session management server 100 is provided with: a key generation information register function 103 to register the key generation information 305 of the terminal 300 in the key generation information DB101; a key generation information retrieve function 104 to retrieve the key generation information 305 from the key generation information DB101; a key generation information acquire function 105 to acquire the key generation information 305 discovered by the key generation information retrieve function 104, from the key generation information DB101; a key generation information send/receive function 106 to send/receive the key generation information 305 with another session management server 100; a log-in manage function 107 to register the ID304 of the terminal 300 in the log-inmanagement DB102 when the terminal 300 is logged in; an ID retrieve function 108 to retrieve the ID304 of the terminal 300 from the log-in management DB102 so as to examine whether or not the terminal 300 is logged in; and a message send/receive function 109 to send/receive the message between the terminal 300 and another session management server 100. However, the message send/receive function 109 does not send and receive a message describing the key generation information.

Moreover, the session management server 100-1 is provided with: a matching function 112 to match the key generation information 305-1 and the key generation information 305-2 in cases where the terminal 300-1 and the terminal 300-2 perform the encryption communications; a session key generate function 110 to generate the session key information 5000 on the basis of the set value described in the matched key generation information; and a session key describe function 111 to describe (or contain) the session key information 5000 in the communication starting request 3000 or the communication starting response 3500 so as to send the session key information 5000 generated to the terminal 300-1 and the terminal 300-2.

Here, Embodiment 1 is configured such that the terminal 300-1 requests communication with the terminal 300-2, and the terminal 300-2 accepts the request for communication from the terminal 300-1.

Moreover, Embodiment 1 is configured to include the two session management servers 100-1 and 100-2 and the two terminals 300-1 and 300-2, but three or more session management servers 100 and terminals 300 may also be connected with one another through the network 0.

Figure 2:
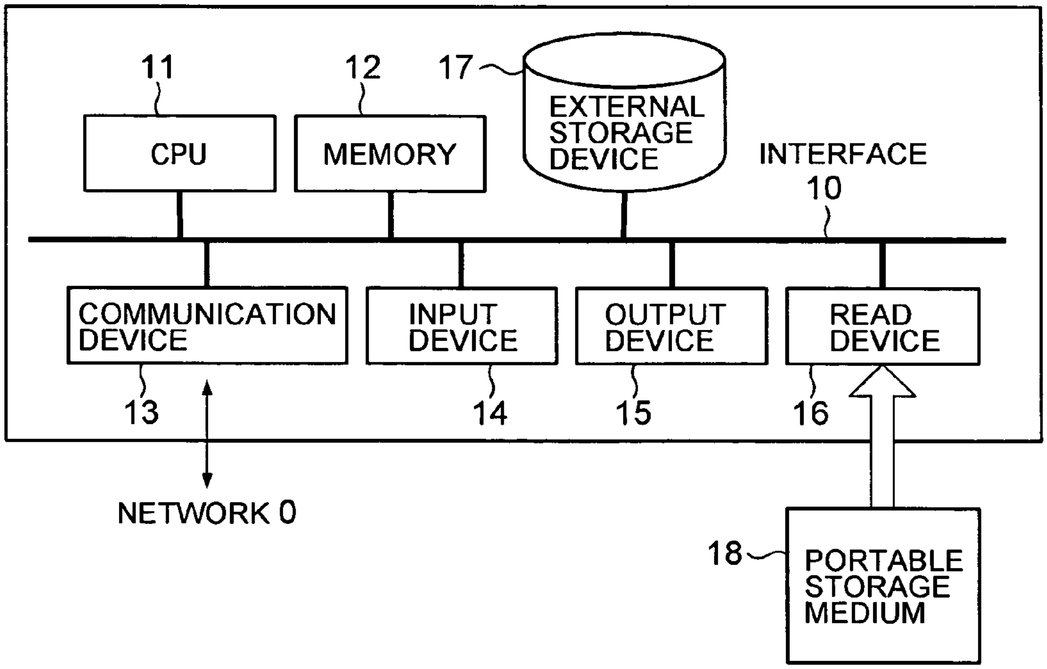
FIG. 2 exemplifies a hardware configuration of the individual configuration components.

FIG. 2 is a diagram showing the hardware configuration of the individual components of FIG. 1, that is, the session management server 100-1, the session management server 100-2, the terminal 300-1, the terminal 300-2, the key generation information DB101 and the log-in management DB102. These devices include a CPU 11, a memory 12, a communication device 13 for communications with another device via the Internet or LAN, an input device 14 such as a keyboard or mouse, an output device 15 such as a monitor or a printer, a read device 16, and an external storage device 17 such as a hard disk are connected through an interface 10. Moreover, the communication device 13 is connected with the network 0 shown in FIG. 1, and a portable storage medium 18 such as an IC card or a USB memory can be connected with the read device 16.

The individual functions of the session management server 100 and the terminal 300 in Embodiment 1 are embodied when the programs for realizing those functions are loaded into the memory 12 and are executed by the CPU 11. These programs may be either stored in advance in the external storage device 17 of the aforementioned information processing apparatus or introduced, if necessary, from another device into the external storage device through the read device 16 or the communication device 13 and the medium which can be utilized by the information processing apparatus. The medium indicates the storage medium 18 that can be removed or attached to the read device 16, the network 0 which can be connected with the communication device 13, or the carrier waves or digital signals propagated on the network 0.

On the other hand, the ID304, the key generation information 305, the information of the GUI screen 306, and the status managed by the status manage function 303 are stored in the external storage device 17 or the portable storage medium 18. In cases where these pieces of information are utilized, the CPU 11 may make direct access to the external storage device 17 or the storage medium 18 or may make access to the memory 12 after those pieces of information are once loaded into the memory 12. Moreover, the character string corresponding to the ID304 is inputted from the input device 14 and is stored in the memory 12, after which the CPU 11 may access the memory 12.

A series of operation sequences for the terminal 300 to log in the session management server 100 is described here.

At first, the user of the terminal 300 refers to the GUI screen 306, and confirms the internal status of the terminal 300. If the internal status is in the unlogged-in status, the user of the terminal 300 instructs the terminal 300 to start the log-in processing. Then, the message send/receive function 302 of the terminal 300 generates the log-in processing request 2000, in which the ID304 and the key generation information 305 are described, (at Step 1001), and sends to the session management server 100 (at Step 1002).

Figure 7A:
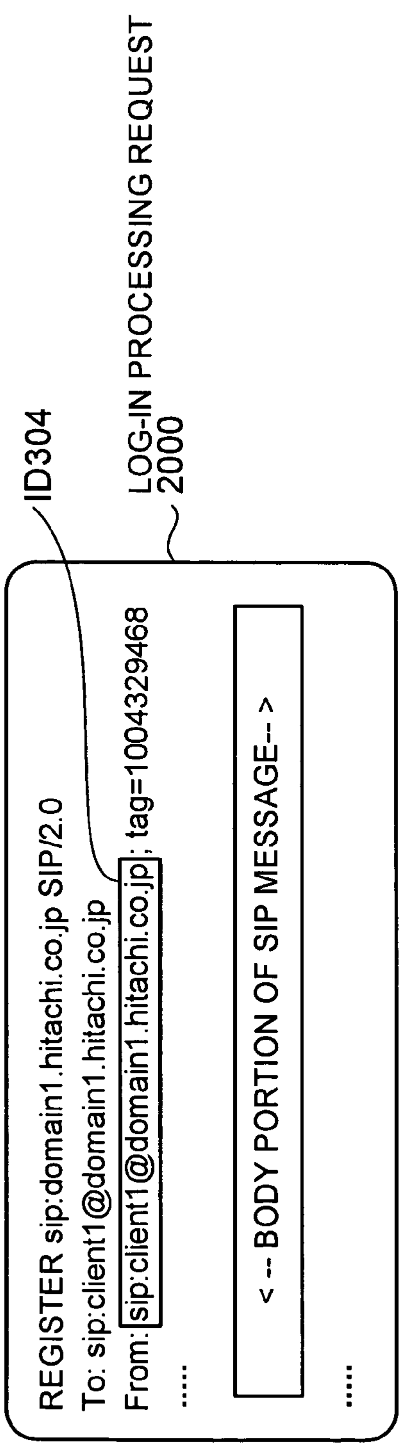
FIGS. 7A and 7B exemplified configuration of a log-in processing request 2000 and a log-in processing response 2500.

FIG. 7A is a diagram showing such a portion of the log-in processing request 2000, which is sent by the terminal 300-1 to the session management server 100-1, as is necessary for the send/receive operations. In Embodiment 1, the log-in processing request 2000 is configured by describing the key generation information 305-1 of the terminal 300-1 described in the XML format, as shown in FIG. 10A, in the BODY portion of the request message of the REGISTER defined by the SIP. Moreover, the ID304-1 of the terminal 300-1 is described in both "To:" field and "From:" field of the request message of the REGISTER.

Figure 3:
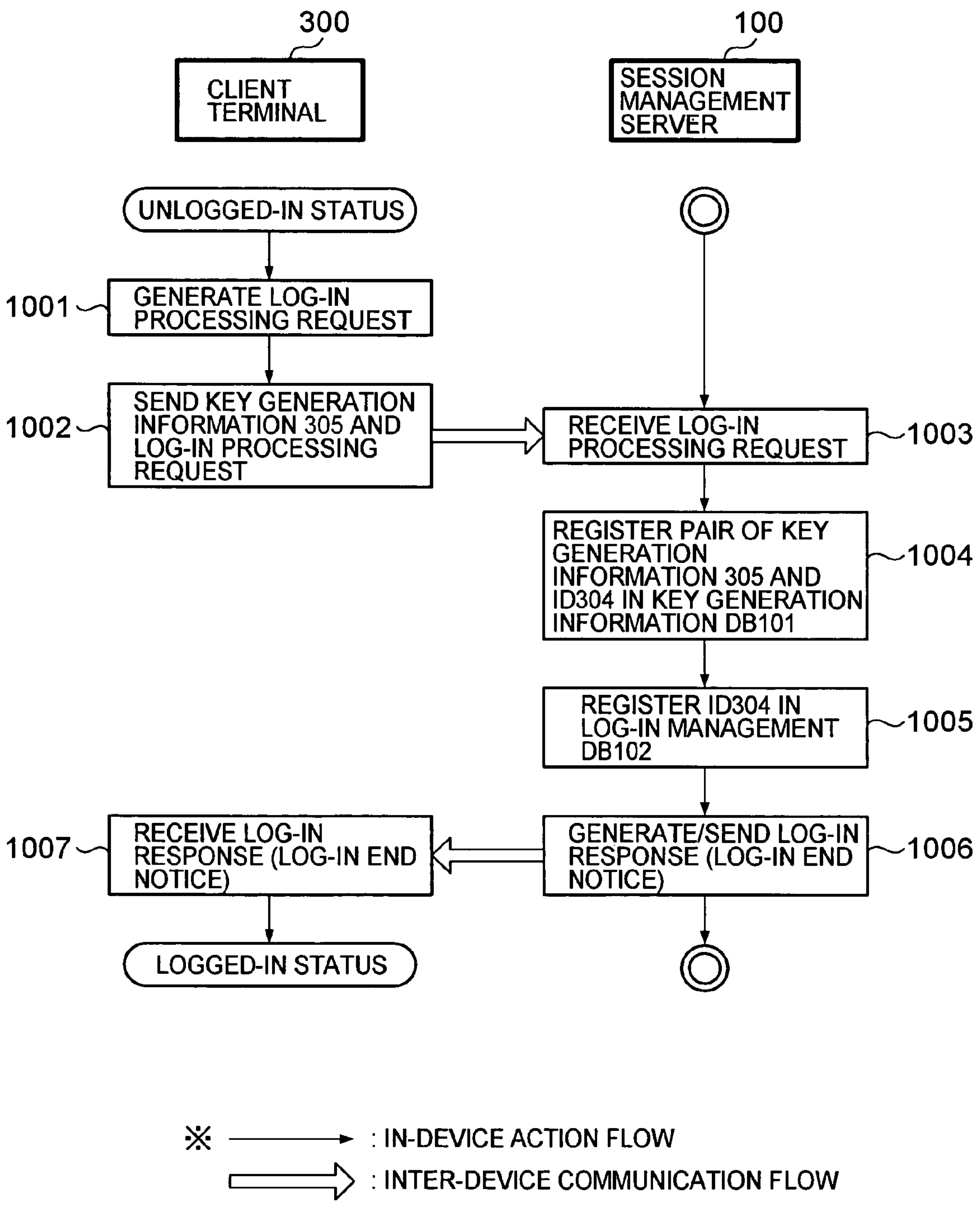
FIG. 3 exemplifies the entire sequence of a log-in processing in Embodiment 1.

When the message send/receive function 109 of the session management server 100 receives (at Step 1003 of FIG. 3) the log-in processing request 2000 from the terminal 300, the key generation information register function 103 registers the pair of the ID304 and the key generation information 305 of the terminal 300, as described in the log-in processing request 2000, in the key generation information DB101 (at Step 1004). When the log-in manage function 107 registers the ID304 in the log-in management DB102 (at Step 1005), the message send/receive function 109 generates the log-in end notice, and sends it as a log-in processing response 2500 to the terminal 300 (at Step 1006).

Figure 7B:
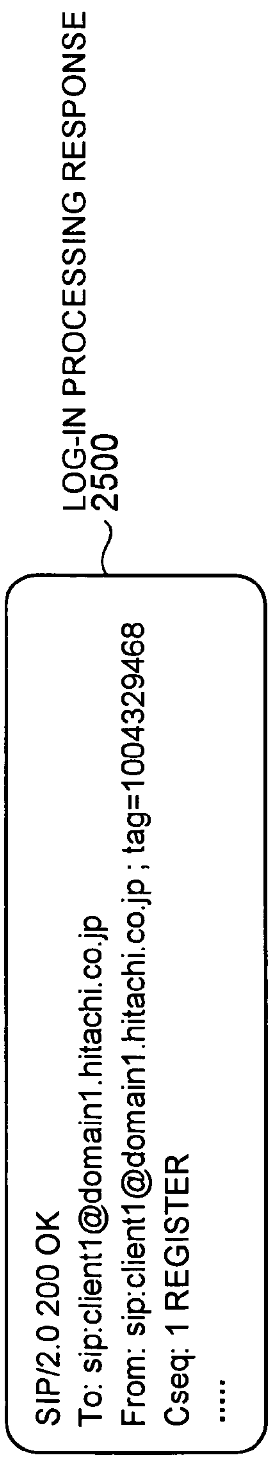

FIG. 7B is a diagram showing such a portion of the log-in processing response 2500, which is sent to the terminal 300-1 by the session management server 100-1, as is necessary for the send/receive operations. In Embodiment 1, the log-in processing response 2500 uses the response message of the REGISTER defined by the SIP, and the log-in end notice uses the 200 OK message.

When the message send/receive function 302 of the terminal 300 receives the log-in processing response 2500 (at Step 1007 of FIG. 3) and recognizes that the log-in processing response 2500 is the log-in ending notice, the status manage function 303 is notified that the terminal 300 has been completely logged in. Then, the status manage function 303 transits the internal status from the unlogged-in status to the logged-in status, and displays the end of the log-in in the GUI screen 306. The user of the terminal 300 confirms the GUI screen 306 and recognizes that the log-in has ended.

The operations thus far described are the operation sequences of Embodiment 1, in which the terminal 300 logs in the session management server 100.

A series of operation sequences is described here, in which the terminal 300-1 shares the session key information for encryption communications with the terminal 300-2 through the session management server 100-1 and the session management server 100-2 thereby to start the encryption communications.

First of all, the user of the terminal 300-1 instructs, confirming in the GUI screen 306-1 that the internal status of the terminal 300-1 is in the logged-in status, the terminal 300-1 to start the encryption communication processing between the terminal 300-1 and the terminal 300-2. Then, the message send/receive function 302 of the terminal 300-1 generates the communication starting request 3000 to the terminal 300-2, and sends it to the session management server 100-1 (at Step 1008 of FIG. 4). In Embodiment 1, the communication starting request 3000 utilizes the request message of INVITE defined by the SIP, as exemplified in FIG. 8A.

When the message send/receive function 109 of the session management server 100-1 receives the communication starting request 3000 from the terminal 300-1 (at Step 1009 of FIG. 4), the ID retrieve function 108 retrieves log-in management DB102-1 on the ID304-1 of the terminal 300-1 described in the From field of the communication starting request 3000. In cases where the retrieval result reveals that the ID304-1 of the terminal 300-1 is not registered in the log-in management DB102-1, the log-in manage function 107 of the session management server 100-1 judges that the terminal 300-1 is not logged in to the session management server 100-1 (at Step 1010). The message send/receive function 109 skips to Step 1046, after it generates the communication establishment failure message to be returned to the terminal 300-1, as the communication starting response 3500 (at Step 1011).

In Embodiment 1, the communication starting response 3500 uses the response message of the INVITE defined with the SIP as shown in FIG. 8B, and the 403 Forbidden message as the communication establishment failure message.

Figure 4:
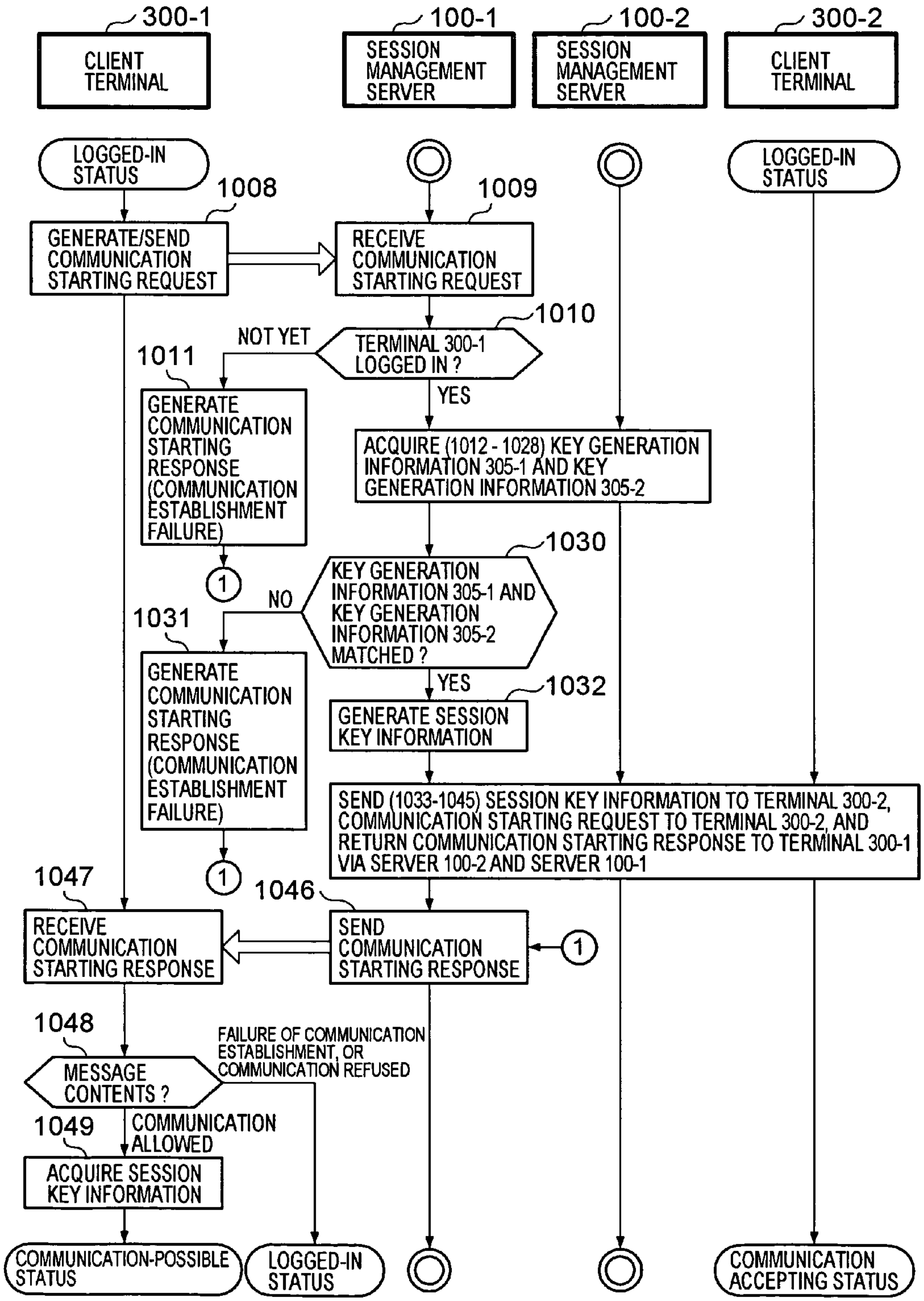
FIG. 4 exemplifies the entire sequence of a session establishing processing in Embodiment 1.
Figure 5:
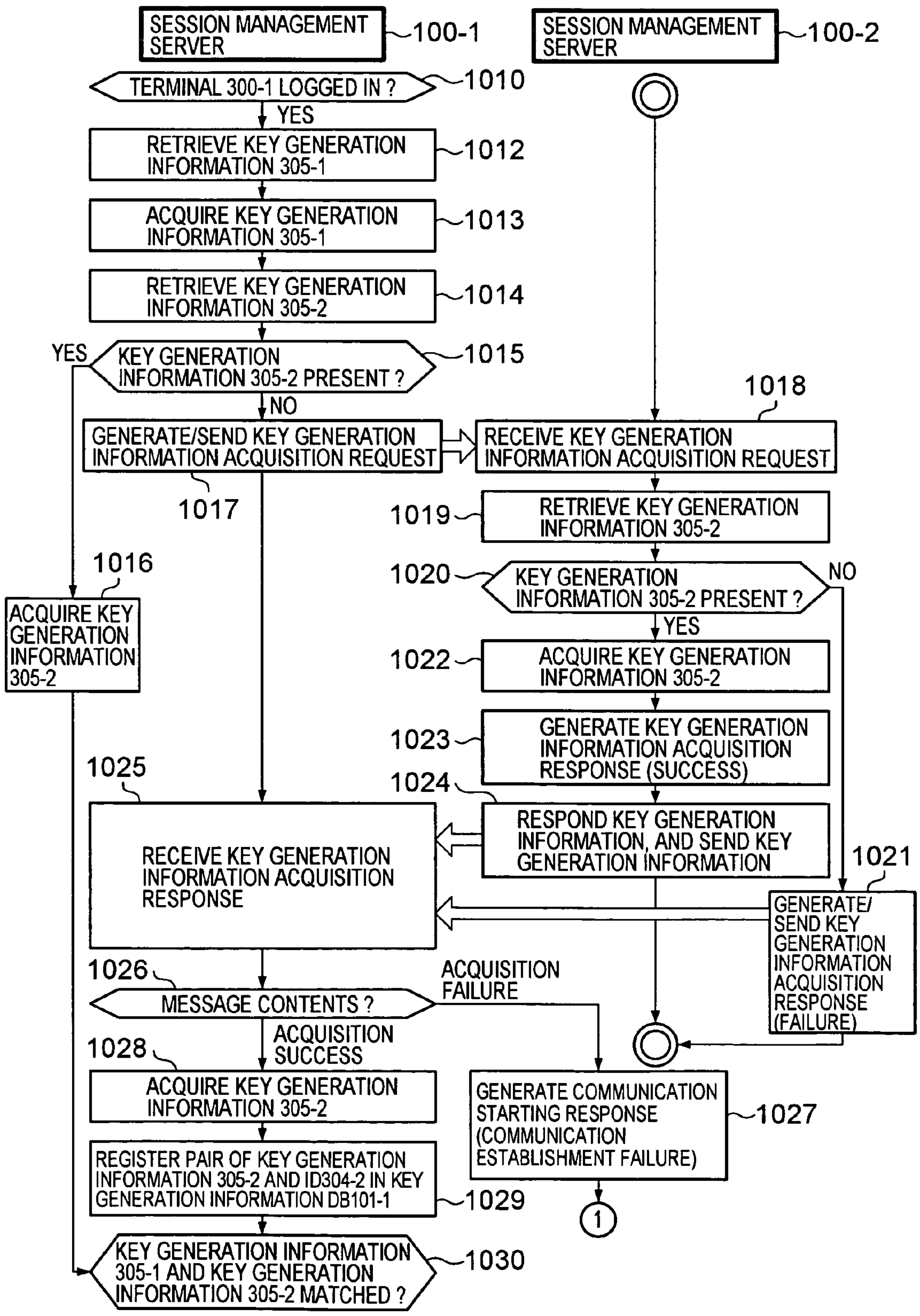
FIG. 5 exemplifies an operation sequence of acquisition processing of key generation information 305-1 of a terminal 300-1 and key generation information 305-2 of a terminal 300-2 in Embodiment 1.

In cases where the ID304-1 is registered in the log-in management DB102-1, the log-in manage function 107 of the session management server 100-1 decides at Step 1010 of FIG. 4 that the terminal 300-1 is logged in, and the key generation information retrieve function 104 retrieves, on the basis of the ID304-1 of the terminal 300-1 described in the From field of the communication starting request 3000, key generation information DB101-1 concerning the key generation information 305-1 of the terminal 300-1 (at Step 1012 of FIG. 5). Since the key generation information 305-1 is registered in the key generation information DB101-1, the key generation information acquire function 105 acquires the key generation information 305-1 on the basis of the retrieval result (at Step 1013).

Subsequently, the key generation information retrieve function 104 retrieves, on the basis of the ID304-2 of the terminal 300-2 described in the To field of the communication starting request 3000, the key generation information DB101-1 for the key generation information 305-2 of the terminal 300-2 (at Step 1014). In cases where the retrieval result reveals that the key generation information 305-2 is in the key generation information DB101-1 (at Step 1015), the key generation information acquire function 105 of the session management server 100-1 acquires the key generation information 305-2 of the terminal 300-2 (at Step 1016), and the operation of Step 1030 is then executed.

In cases where it is decided at Step 1015 that the key generation information 305-2 of the terminal 300-2 is not in the key generation information DB101-1, the log-in manage function 107 of the session management server 100-1 recognizes, on the basis of the portion at and after "@" of the ID304-2 of the terminal 300-2 described in the To field of the communication starting request 3000, that the session management server 100-2 is the log-in target of the terminal 300-2. The key generation information send/receive function 106 generates a key generation information acquisition request 4000 of the terminal 300-2, and sends the request to the session management server 100-2 of the log-in target (at Step 1017).

In Embodiment 1, it is assumed that the key generation information acquisition request 4000 is described as the XML message. FIG. 9A shows such a portion of the key generation information acquisition request 4000 to be sent by the session management server 100-1 to the session management server 100-2 as is needed for the send/receive operations. The session management server 100-1 describes the name of its own device in a request source field 4001 of the key generation information acquisition request 4000, and describes the name of the session management server 100-2 in a request target field 4002. Moreover, the ID304-2 of the terminal 300-2 or the owner of the key generation information 305-2 requested by the session management server 100-1 is described in a request object ID field 4003. Here, a plurality of ID304 of the terminal 300 requested may be described in the request object ID field 4003.

When the key generation information send/receive function 106 of the session management server 100-2 receives the key generation information acquisition request 4000 from the session management server 100-1 (at Step 1018 of FIG. 5), the key generation information retrieve function 104 retrieves, on the basis of the ID304-2 of the terminal 300-2 described in the key generation information acquisition request 4000, key generation information DB101-2 concerning the key generation information 305-2 of the terminal 300-2 (at Step 1019).

In cases where the retrieval result reveals that the key generation information 305-2 of the terminal 300-2 is not in the key generation information DB101-2 (at Step 1020), the key generation information send/receive function 106 of the session management server 100-2 generates the key generation information acquisition failure message to be sent to the session management server 100-1, and returns it as a key generation information acquisition response 4500 (at Step 1021).

In cases where it is found at Step 1020 that the key generation information 305-2 is in the key generation information DB101-2, the key generation information acquire function 105 acquires the key generation information 305-2 of the terminal 300-2 from the key generation information DB101-2 (at Step 1022). Then, the key generation information send/receive function 106 generates the key generation information acquisition success message describing the key generation information 305-2 (at Step 1023), and returns it as the generation information acquisition response 4500 to the session management server 100-1 (at Step 1024).

In Embodiment 1, it is assumed that the key generation information acquisition response 4500 is described as an XML message. FIG. 9B shows such a portion of the key generation information acquisition request 4500 to be returned by the session management server 100-2 to the session management server 100-1 as is needed for the send/receive operations. The session management server 100-2 describes the name of the session management server 100-1 in a request source field 4501 of the key generation information acquisition response 4500, and describes the name of its own device in a request target field 4502. Moreover, the ID304-2 of the terminal 300-2 owning of the key generation information 305-2 requested by the session management server 100-1 is described in a request object ID field 4503, and the acquired result of the key generation information 305-2 of the terminal 300-2 is described in a request result field 4504. In the case of the acquisition success, for example, "OK" is described in the request result field 4504. In the case of acquisition failure, for example, "NG" is described. Moreover, the key generation information 305-2 of the acquired terminal 300-2 is described in a key generation information field 4505. The ID304 and the key generation information 305 of the terminal 300 may be written in plurality in the request object ID field 4503 and the key generation information field 4505.

The key generation information send/receive function 106 of the session management server 100-1 receives the key generation information acquisition response 4500 sent at Step 1021 or Step 1024 by the session management server 100-2 (at Step 1025 of FIG. 5). In cases where the key generation information acquisition response 4500 is then the key generation information acquisition failure message (at Step 1026), the message send/receive function 109 generates the communication establishment failure message for the terminal 300-1, as the communication starting response 3500 (at Step 1027), and the operation of Step 1046 is executed.

In cases where the key generation information acquisition response 4500 is the key generation information acquisition success message (at Step 1026), the message send/receive function 109 of the session management server 100-1 acquires the key generation information 305-2 of the terminal 300-2 described in the key generation information acquisition response 4500 (at Step 1028). Then, the key generation information register function 103 registers the pair of the key generation information 305-2 and the ID304-2 of the terminal 300-2 in the key generation information DB101-1 (at Step 1029), and the operation of the Step 1030 of FIG. 4 is then executed.

Next, the matching function 112 of the session management server 100-1 matches the acquired key generation information 305-1 of the terminal 300-land the key generation information 305-2 of the terminal 300-2 at Step 1030.

For example, the session management server 100-1 prefers either the key generation information 305-1 of the terminal 300-1 or the key generation information 305-2 of the terminal 300-2, selects the encryption algorithm suite described in the preferred key generation information 305, in the preferred order (from the uppermost one, for example), retrieves the encryption algorithm suite of another key generation information 305 in the preferred order (from the upper one, for example) on the basis of the encryption algorithm suite name selected, and select the algorithm suite of the first coincidence. In cases where no coincident algorithm suite name is found, the encryption algorithm suite name is retrieved sequentially from the upper one of the key generation information 305 on the basis of the encryption algorithm suite name described on the second order from the top of the preferred key generation information 305. By this procedure, the key generation information 305-1 and the key generation information 305-2 are matched.

In Embodiment 1, the matching function 112 selects the "3DES-168bit" which is the encryption algorithm suite name described at the uppermost position of the key generation information 305-1 of the terminal 300-1, and examines whether or not "3DES-168bit" is in the key generation information 305-2 of the terminal 300-2. The encryption algorithm suite "3DES-168bit" is selected because it is contained in the key generation information 305-2.

In cases where the matching result reveals no encryption algorithm suite usable for the encryption communications between the terminal 300-1 and the terminal 300-2, the message send/receive function 109 of the session management server 100-1 generates the communication establishment failure message to the terminal 300-1 as the communication starting response 3500 (at Step 1031), and executes the operation of Step 1046. In cases where the encryption algorithm suite is present, the matching function 112 selects, with the matching between the key generation information 305-1 and the key generation information 305-2, the algorithm suite to be used for the encryption communications, and the generates such matched key generation information 307 that the selected algorithm suite name is enclosed by the enc tag of XML, as shown in FIG. 10C. The session key generate function 110 generates, on the basis of the set value described in the matched key generation information 307, the session key information 5000 (at Step 1032).

In Embodiment 1, the session key information 5000 is described as the XML message. FIG. 10D shows such a portion of the session key information 5000 to be generated by the session management server 100-1 and sent to the terminal 300-1 and the terminal 300-2 as is needed for the send/receive operations.

The session key information 5000 describes the encryption algorithm suite "3DES-168bit" to be applied for the encryption communications between the terminal 300-1 and the terminal 300-2, in an encryption algorithm field 5001. The "3DES-168bit" is the name of the encryption algorithm suite for encryptions/decryptions using the encryption algorithm of 3DES, the key of 168 bits, the ECB operation mode, and the padding algorithm defined by PKCS#5, and is selected as a result that the session management server 100-1 has matched the key generation information 305-1 of the terminal 300-1 and the key generation information 305-2 of the terminal 300-2. Moreover, the validity period of the session key generated by the session management server 100-1 is described in a key validity period field 5002. In the example of FIG. 10D, "3600" is described in the key validity period field 5002 (at the unit of second), and indicates that the validity period of the session key is one hour. Moreover, the session key to be used for the encryption communications is described in a key field 5003.

Figure 6:
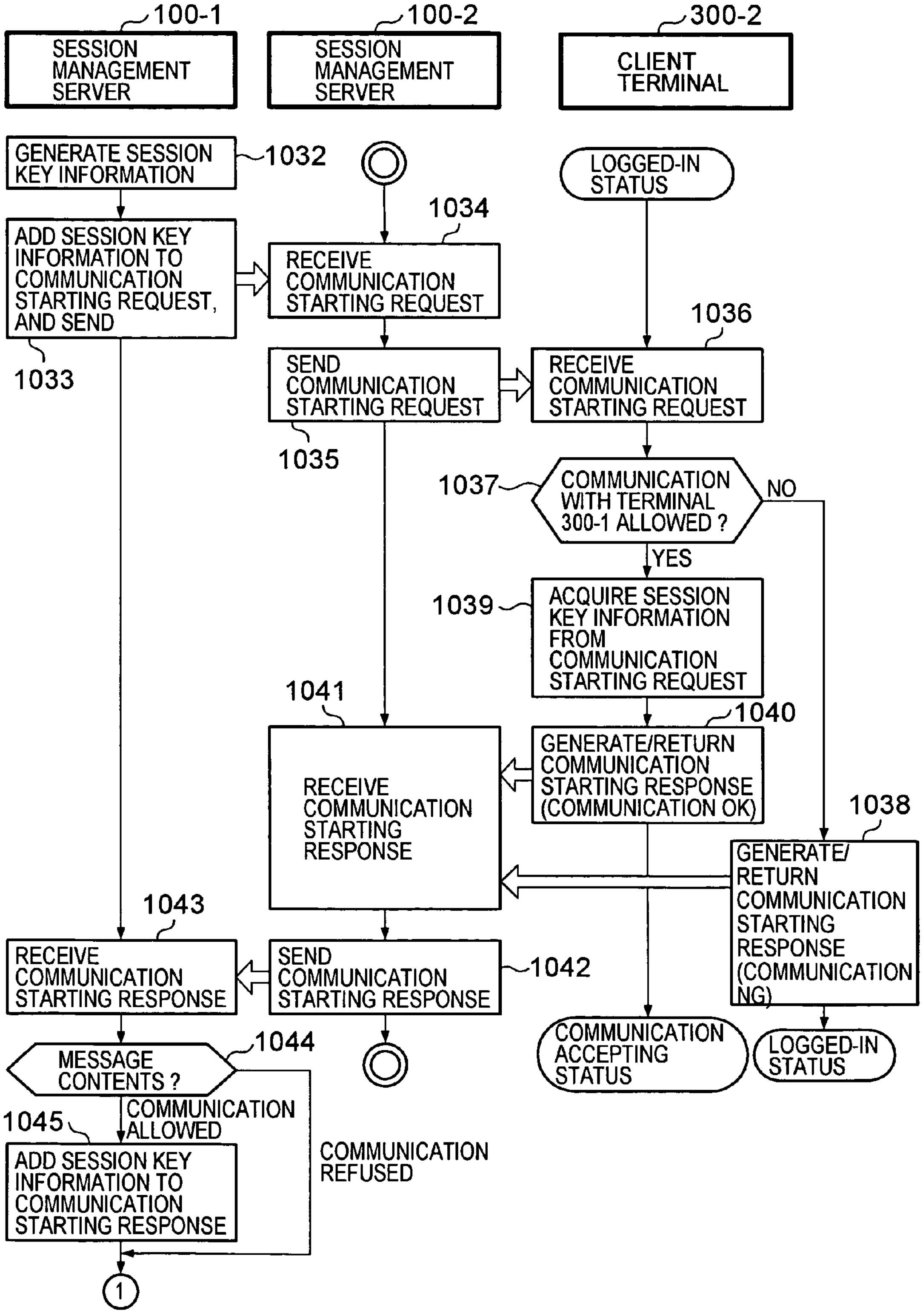
FIG. 6 exemplifies an operation sequence of session key assignments to the terminal 300-1 and the terminal 300-2 in Embodiment 1.

After the session key generate function 110 of the session management server 100-1 generates the session key information 5000, the session key describe function ill describes (or contains) the session key information 5000 in the communication starting request 3000. Then, the message send/receive function 109 sends the communication starting request 3000 to the session management server 100-2 (at Step 1033 of FIG. 6), when the session management server 100-2 recognizes the log-in target of the terminal 300-2 on the basis of the portion at and after "@" of the ID304-2 of the terminal 300-2 described in the To field of the communication starting request 3000. Here, the communication starting request 3000 to be sent/received at and after Step 1033 describes the session key information 5000 in the XML format, in the BODY portion of the communication starting request 3000 shown in FIG. 8A.

The message send/receive function 109 of the session management server 100-2 sends, when it receives the communication starting request 3000 from the session management server 100-1 (at Step 1034), the communication starting request 3000 to the terminal 300-2 (at Step 1035).

The message send/receive function 302 of the terminal 300-2 examines, when it receives the communication starting request 3000 from the session management server 100-2 (at Step 1036), the contents of the communication starting request 3000, and judges whether or not the communication with terminal 300-1 is allowed (at Step 1037).

The message send/receive function 302 of the terminal 300-2 generates, in cases where the encryption communication with the terminal 300-1 is denied, the communication NG message, and returns it as the communication starting response 3500 to the session management server 100-2 (at Step 1038). Then, the status manage function 303 transits the internal status to the logged-in status, and indicates in a GUI screen 306-2 that the communication from the terminal 300-1 has been denied, so that the user of the terminal 300-2 may be able to recognize it from the screen display that the terminal 300-2 has rejected the communication from the terminal 300-1.

Here in Embodiment 1, the aforementioned communication rejecting message is exemplified by the 401 Unauthorized message of the INVITE response defined in the SIP.

In case the encryption communication with the terminal 300-1 is allowed at Step 1037, on the other hand, the session key extract function 301 of the terminal 300-2 acquires the session key information 5000 described in the communication starting request 3000 received (at Step 1039). The message send/receive function 302 generates the communication OK message, and returns it as the communication starting response 3500 to the session management server 100-2 (at Step 1040). Moreover, the status manage function 303 transits the internal status to the communication accepting status, and indicates in the GUI screen 306-2 that the communication from the terminal 300-1 has been allowed. The user of the terminal 300-2 recognizes it by confirming the GUI screen 306-2 that the communication session with the terminal 300-1 has been established.

In Embodiment 1, the aforementioned communication OK message is exemplified by the 200 OK message of the INVITE response defined by the SIP, as shown in FIG. 8B.

The message send/receive function 109 of the session management server 100-2 sends, when it receives the communication starting response 3500 from the terminal 300-2 (at Step 1041), the communication starting response 3500 to the session management server 100-1 (at Step 1042).

The message send/receive function 109 of the session management server 100-1 examines, when it receives the communication starting response 3500 from the session management server 100-2 (at Step 1043),the contents of the communication starting response 3500 (at Step 1044) and confirms whether or not the communication starting request 3000 of the terminal 300-1 for the terminal 300-2 has been allowed. In case the communication starting response 3500 is the communication rejecting message, the operation of Step 1046 is executed. In case the communication starting response 3500 is the communication allowing message, the session key describe function 111 describes the session key information 5000 in the communication starting response 3500 (at Step 1045), and the operation of Step 1046 is executed. Here, the communication starting response 3500 to be sent/received at or after Step 1033 describes the session key information 5000 described in the XML format, in the BODY portion of the communication starting response 3500 shown in FIG. 8B.

The message send/receive function 109 of the session management server 100-1 sends the communication starting response 3500 to the terminal 300-1 (at Step 1046 of FIG. 4).

The message send/receive function 302 of the terminal 300-1 confirms, when it receives the communication starting response 3500 from the session management server 100-1 (at Step 1047), the contents of the communication starting response 3500 received (at Step 1048).

If the communication starting response 3500 is the communication rejecting message, the status manage function 303 of the terminal 300-1 transits the internal status to the logged-in state, and displays in the GUI screen 306-1 that the communication to the terminal 300-2 has been rejected. The user of the terminal 300-1 recognizes it by confirming the GUI screen 306-1 that the establishment of the communication session with the terminal 300-2 has failed.

In cases where the communication starting response 3500 is the communication allowing message, the session key extract function 301 of the terminal 300-1 acquires the session key information 5000 described in the communication starting response 3500 (at Step 1049), and the status manage function 303 transits the internal status to the communicable status with the terminal 300-2, and displays in the GUI screen 306-1 that the communication with the terminal 300-2 has been allowed. The user of the terminal 300-1 recognizes it by confirming the GUI screen 306-1 that the communication session with the terminal 300-2 has been established.

Then, the terminal 300-1 and the terminal 300-2 start the encryption communications by using the key described in the session key information 5000 acquired, but not through the session management server 100-1 and the session management server 100-2.

What has been thus far described is the operation sequence of Embodiment 1, which shares the session key for the encryption communications between the terminal 300-1 and the terminal 300-2 through the session management server 100-1 and the session management server 100-2 thereby to start the encryption communications.

Here in Embodiment 1, the session key generate function 110 of the session management server 100-1 generates the session key. In case, too, the session management server 100-2 and the terminal 300 have the session key generate function 110, the terminal 300-1 and the terminal 300-2 can share the session key later. In this case, the terminal 300-1 and the terminal 300-2 can share the session key in the following manner.

For example, the matching function 112 of the session management server 100-1 matches the key generation information 305-1 of the terminal 300-1 acquired and the key generation information 305-2 of the terminal 300-2 at Step 1030, and a random number generate function, as newly owned by the session management server 100-1, then generates a random number for the key generation on the basis of the set value described in the matched key generation information 307. After this, the message send/receive function 109 describes the matched key generation information 307 and the random number in the session key information 5000, and sends to the terminal 300-1 and the terminal 300-2.

The terminal 300-1 and the terminal 300-2 are provided with the session key generate function 110. When the message send/receive function 302 receives the algorithm suite information contained in the session key information 5000 and used for the encryption communication and the random number for the key generation, the session key generate function 110 causes the individual terminals to generate the common session key from that random number, and the status manage function 303 transits the internal statuses of the terminal 300-1 and the terminal 300-2 into the communicable status and the communication accepting status, so that the communication session is established. After this, the status manage function 303 of the terminal 300-2 displays in the GUI screen 306-2 that the communication from the terminal 300-1 is allowed, and the user of the terminal 300-2 recognizes it by confirming the GUI screen 306-2 that the communication session with the terminal 300-1 has been established. Moreover, the status manage function 303 of the terminal 300-1 displays it in the GUI screen 306-1 that the communication with the terminal 300-2 has been allowed. The user of the terminal 300-1 recognizes it by confirming the GUI screen 306-1 that the communication session with the terminal 300-2 has been established.

Thus, the terminal 300-1 and the terminal 300-2 share the session key to be used for the encryption communications, and start the encryption communications by using that key.

In cases where the session management server 100-2 is provided with the session key generate function 110, the session key describe function 111 and the matching function 112 of the session management server 100-1, the session management server 100-2 acquires the key generation information 305-1 of the terminal 300-1 and the key generation information 305-2 of the terminal 300-2, and can match the key generation information 305-1 and the key generation information 305-2 and to generate the session key information 5000.

Specifically, at Step 1013 of FIG. 5, the key generation information acquire function 105 of the session management server 100-1 acquires the key generation information 305-1 of the terminal 300-1, and the message send/receive function 109 describes the key generation information 305-1 in the communication starting request 3000, and sends it to the session management server 100-2. The message send/receive function 109 of the session management server 100-2 receives the communication starting request 3000 and the key generation information 305-1, and the key generation information acquire function 105 then acquires the key generation information 305-2 of the terminal 300-2. Then, the matching function 112 matches the key generation information 305-1 and the key generation information 305-2.

In cases where the matching result finds the encryption algorithm suite to be used for the encryption communications between the terminal 300-1 and the terminal 300-2, the matching function 112 selects the algorithm suite to be used for the encryption communications, and generates the matched key generation information 307. The session key generate function 110 generates the session key information 5000 on the basis of the set value described in the matched key generation information 307.

Moreover, the session management server 100-1 may match the key generation information 305-1 of the terminal 300-1 and the key generation information 305-2 of the terminal 300-2 by a method other than that exemplified in Embodiment 1.

Specifically, a conceivable method is based on the policy of the session management server 100-1. Specifically, the session management server 100-1 is provided with a policy for selecting the algorithm suite which can be used for the encryption communications, to match the key generation information 305-1 and the key generation information 305-2 on the basis of that policy.

In cases where the session management server 100-1 selects the algorithm suite of the highest speed, for example, it is assumed that the session management server 100-1 is provided with the policy for selecting the data pairing the algorithm suite usable in the encryption communications and the processing speed of each algorithm suite, and the policy for selecting the highest speed algorithm suite with reference to that data.

Specifically, it is assumed that the session management server 100-1 is provided with the corresponding table of the common data of the algorithm suite of “3DES-168bit”, “AES-128bit”, “AES-192bit” and “AES-256bit” and that the processing speed under the common architecture of 7 ms, 10 ms, 14 ms, 20 ms and 25 ms. In this case, the session management server 100-1 describes the algorithm suite name at the key generation information 305-1 of the terminal 300-1 and the key generation information 305-2 of the terminal 300-2, and selects the highest speed algorithm suite “3DES-168bit”.

In cases where the session management server 100-1 selects the algorithm suite of the highest safety, on the other hand, it is assumed that the session management server 100-1 is provided with the policy for selecting the data pairing the algorithm suite usable in the encryption communications and the index quantizing the safety of each algorithm suite, and the policy for selecting the highest safety algorithm suite with reference to that data.

Specifically, it is assumed that the session management server 100-1 is provided with the corresponding table of the common data of the algorithm suite of “3DES-168bit”, “AES-128bit”, “AES-192bit” and “AES-256bit” and that the safety indices on the common architecture of 5, 8, 24, and 30, and that the algorithm suite is safer for the higher indices. In this case, the session management server 100-1 describes the algorithm suite name at the key generation information 305-1 of the terminal 300-1 and the key generation information 305-2 of the terminal 300-2, and selects the highest safety algorithm suite “AES-192bit”.

Other than the aforementioned safety and the high speed of the algorithm suite, moreover, the session management server 100-1 can also be provided with a policy in that the algorithm of the stream encryption is selected according to the kind (e.g., block encryption or stream encryption) of the encryption algorithm.

In addition, a method based on a policy of the communication partner terminal, i.e., the terminal 300-2 can be conceived as the method for matching the key generation information 305-1 of the terminal 300-1 and the key generation information 305-2 of the terminal 300-2. Specifically, the terminal 300-2 is assumed to have information on the policy for selecting the algorithm suite to be used in the encryption communications (i.e., for selecting the algorithm suite of the high safety or for selecting the algorithm suite of the high speed). If, in this case, the terminal 300-2 registers the policy information for selecting the algorithm suite at the log-in time together with the key generation information 305-2 in the session management server 100-1, this session management server 100-1 can match the key generation information on the basis of the policy information, as acquired from the terminal 300-2, for selecting the algorithm suite.

The manager of the session management server 100-1 for the actual matching may freely select which of the key generation information matching methods thus far described is to be applied.

Even in cases where the terminal 300-2 logs in the session management server 100-1, the session management server 100-1 generates and distributes the session key information 5000 to the terminal 300-1 and the terminal 300-2 so that the terminal 300-1 and the terminal 300-2 can share the session key. In this case, the following potion is different from that of Embodiment 1.

In cases where it is decided at Step 1015 that the key generation information 305-2 of the terminal 300-2 is "NO" in the key generation information DB101-1, the session management server 100-1 recognizes, on the basis of the portion at and after "@" of the ID304-2 of the terminal 300-2 described in the To field, that the session management server 100-1 is the log-in target of the terminal 300-2, and the routine shifts to Step 1027. Specifically, the message send/receive function 109 of the session management server 100-1 generates the communication establishment failure message to the terminal 300-1 as the communication starting response 3500. After this, the operation of Step 1046 is executed.

In cases where the answer of Step 1015 is "YES", the operation of Step 1016 is executed.

Next, after the session key generate function 110 of the session management server 100-1 generates the session key information 5000 at Step 1032, the message send/receive function 109 recognizes, on the basis of the portion at and after "@" of the ID304-2 of the terminal 300-2 described in the To field of the communication starting request 3000, that the session management server 100-1, namely, its own device, is the log-in target of the terminal 300-2. At Step 1035, the communication starting request 3000 is sent to the terminal 300-2.

Next, at Step 1038 or Step 1040, the message send/receive function 302 of the terminal 300-2 generates the communication starting response 3500, and returns it to the session management server 100-1 at Step 1042.

Embodiment 2

Embodiment 2 is described as an example of the encryption communication system using an SIP different from that of Embodiment 1.

Figure 11:
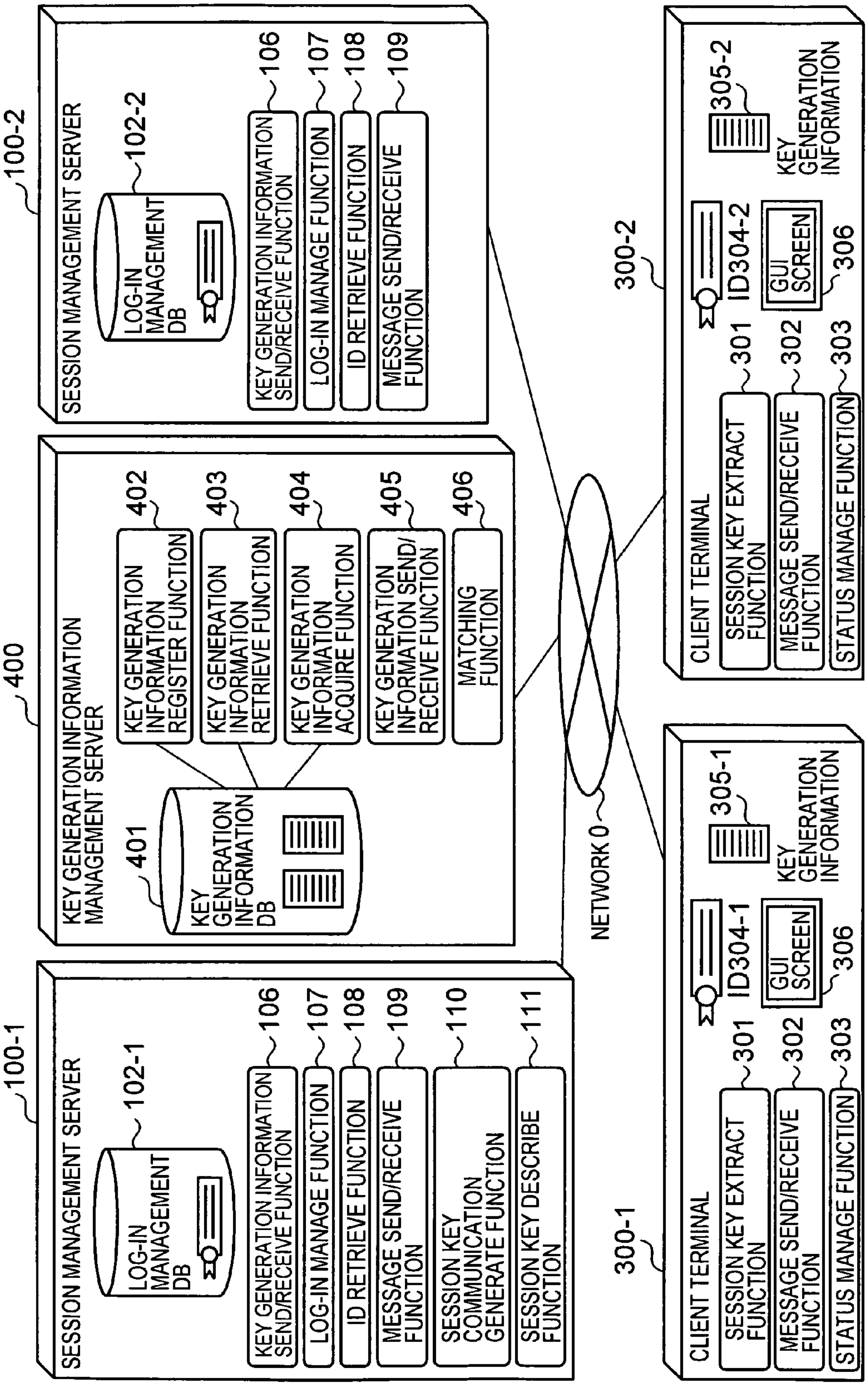
FIG. 11 exemplifies individual configuration components and functional information of an encryption communication system of Embodiment 2.

FIG. 11 is a configuration diagram showing the encryption communication system of Embodiment 2. A key generation information management server 400 is newly added to the encryption communication system, and the portions connecting the server 400 and other system configuration components via the network 0 are different from those of Embodiment 1.

The key generation information management server 400 is provided with the key generation information DB101 owned by the session management server 100 in Embodiment 1, as a key generation information DB401. This key generation information DB401 can be configured as the device contained in the key generation information management server 400 as in Embodiment 2. Alternatively, the key generation information DB401 may be configured as a device different from the key generation information management server 400, and the key generation information DB401 and the key generation information management server 400 may be connected via the network.

The key generation information management server 400 is provided with a key generation information register function 402, a key generation information retrieve function 403, a key generation information acquire function 404 and a matching function 406 owned by the session management server 100 in Embodiment 1, respectively, as the key generation information register function 103, the key generation information retrieve function 104, the key generation information acquire function 105 and the matching function 112. The key generation information management server 400 is further provided with a key generation information send/receive function 405 to send/receive the key generation information 305 of the client terminal 300 with the session management server 100.

The hardware configurations of the key generation information management server 400 and the key generation information DB401 are shown in FIG. 2, and the method for realizing their functions is similar to that of Embodiment 1 so that its description is omitted. For example, the individual functions of the key generation information management server 400 are embodied such that the programs for realizing the functions are loaded in the memory 12 and are executed by the CPU 11.

In Embodiment 2, the key generation information acquire function 404 of the session management server 100 sends, when it acquires the key generation information 305 from the logged-in terminal 300, the key generation information 305 to the key generation information management server 400. Therefore, the session management server 100 of Embodiment 2 is not provided with the key generation information DB101, and the key generation information register function 103, the key generation information retrieve function 104 and the key generation information acquire function 105 to make access to the key generation information DB101, because they are unnecessary.

On the other hand, the key generation information send/receive function 106, as owned by the session management server 100 in Embodiment 2, is a function to send/receive the key generation information 305 of the terminal 300 between the session management server 100 and the key generation information management server 400.

Next, a series of operation sequences for the terminal 300 to log in the session management server 100 is described with reference to FIG. 12. Embodiment 2 is different from Embodiment 1 in the operations for the session management server 100 to send the key generation information 305 acquired from the terminal 300, to the key generation information management server 400.

At first, the operations of Step 1101 and Step 1102 are identical to those of Step 1001 and Step 1002 of Embodiment 1, respectively, so their description is omitted.

Figure 12:
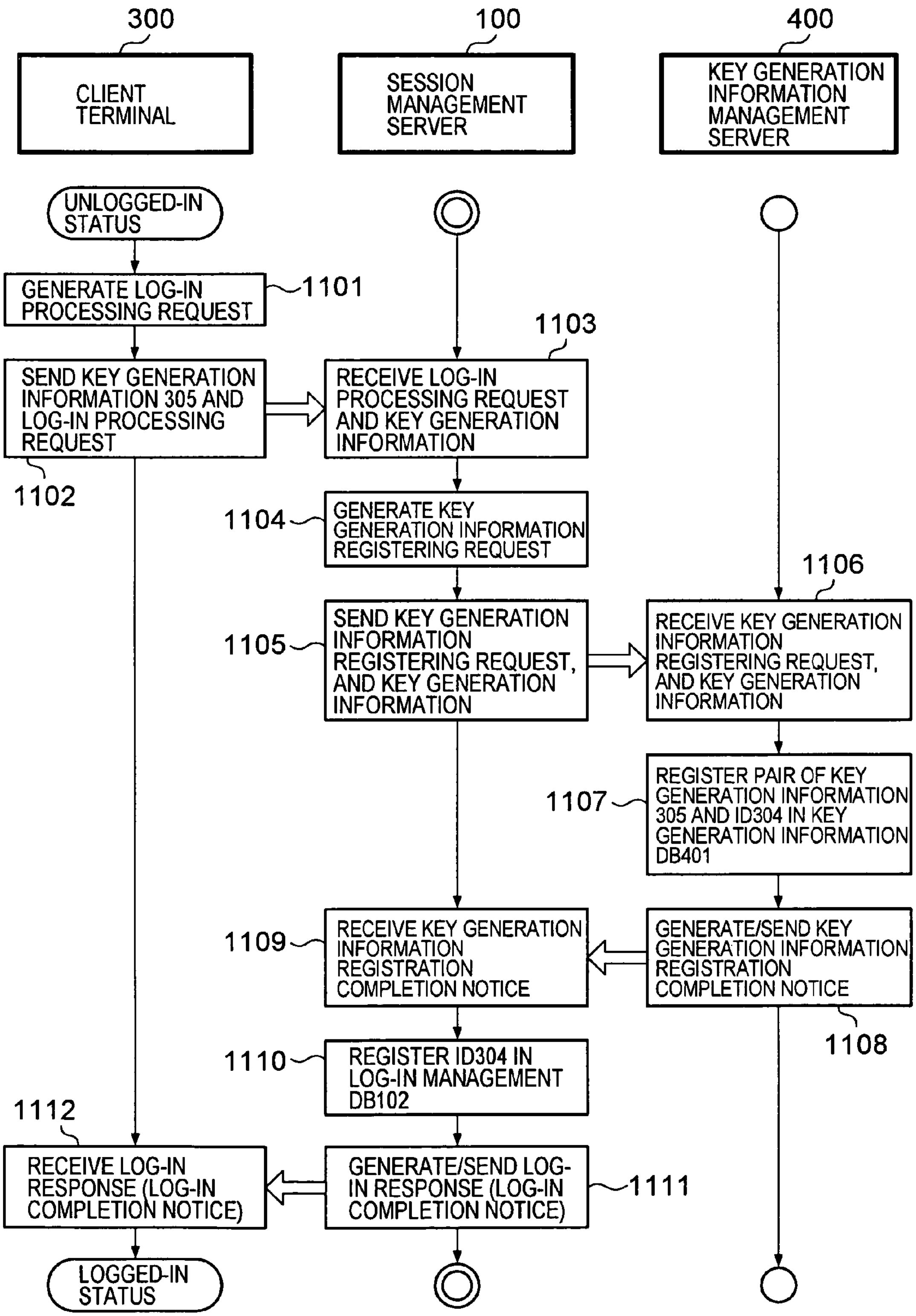
FIG. 12 exemplifies the entire sequence of a log-in processing in Embodiment 2.

After Step 1102, the message send/receive function 109 of the session management server 100 receives the log-in processing request 2000 from the terminal 300 (at Step 1103 of FIG. 12). Then, the key generation information send/receive function 106 generates a key generation information registration request 6000 which describes the ID 304 of the terminal 300 and the key generation information 305 of the terminal 300 (at Step 1104), and sends the request to the key generation information management server 400 (at Step 1105).

In Embodiment 2, the key generation information registration request 6000 is described as an XML message. FIG. 15A shows such a portion of the key generation information registration request 6000 to be sent by the session management server 100-1 to the key generation information management server 400 as is needed for the send/receive operations. The name of the session management server 100-1 is described in a request source field 6001, and the name of the key generation information management server 400 is described in a request target field 6002. Moreover, the ID304-1 of the terminal 300-1 or the owner of the key generation information 305-1 to be registered in the key generation information management server 400 is described in a registration object ID field 6003, and the key generation information 305-1 of the terminal 300-1 is described.

When the key generation information send/receive function 405 of the key generation information management server 400 receives the key generation information registration request 6000 from the session management server 100 (at Step 1106 of FIG. 12), the key generation information register function 402 registers the pair of the ID 304 and the key generation information 305 of the terminal 300 described in the key generation information registration request 6000, in the key generation information DB 401 (at Step 1107). After this, the key generation information send/receive function 405 generates the key generation information registration ending notice, and sends it as a key generation information registration response 6500 to the session management server 100 (at Step 1108).

In Embodiment 2, it is assumed that the key generation information registration response 6500 is described in the XML message. FIG. 15B shows such a portion of the key generation information registration response 6500 to be sent by the key generation information management server 400 to the session management server 100-1 as is needed for the send/receive operations. The name of the session management server 100-1 is described in a request source field 6501 of the key generation information registration response 6500, and the name of the key generation information management server 400 is described in a request target field 6502. Moreover, the ID304-1 of the terminal 300-1 or the owner of the key generation information 305-1 to be registered in the key generation information management server 400 is described in a registration object ID field 6503. Moreover, the key generation information management server 400 describes the registration result of the key generation information 305-1 of the terminal 300-1 in a registration result field 6504. In the case of the acquisition success, for example, "OK" is described in the registration result field 6504. In the case of acquisition failure, for example, "NG" is described.

When the key generation information send/receive function 106 of the session management server 100 receives the key generation information registration response 6500 from the key generation information management server 400 (at Step 1109 of FIG. 12), the log-in manage function 107 registers the ID304 of the terminal 300 described in the log-in processing request 2000, in the log-in management DB 102 (at Step 1110). After this, the message send/receive function 109 generates the log-in ending notice, and sends it as the log-in processing response 2500 to the terminal 300 (at Step 1111).

When the message send/receive function 302 of the terminal 300 receives the log-in processing response 2500 (at Step 1112) and recognizes that the log-in processing response 2500 is the log-in ending notice, it informs the status manage function 303 that the terminal 300 has been logged in. Then, the status manage function 303 transits the internal status from the unlogged-in status to the logged-in status, and displays in the GUI screen 306 that the log-in has been completed. The user of the terminal 300 recognizes it by confirming the GUI screen 306 that the log-in has been completed.

The operations thus far described are the operation sequences of Embodiment 2, in which the terminal 300 logs in the session management server 100.

Here is described a series of operation sequences, in which the terminal 300-1 shares the session key information for encryption communications with the terminal 300-2 through the session management server 100-1, the session management server 100-2 and the key generation information management server 400, thereby to start the encryption communications.

Figure 13:
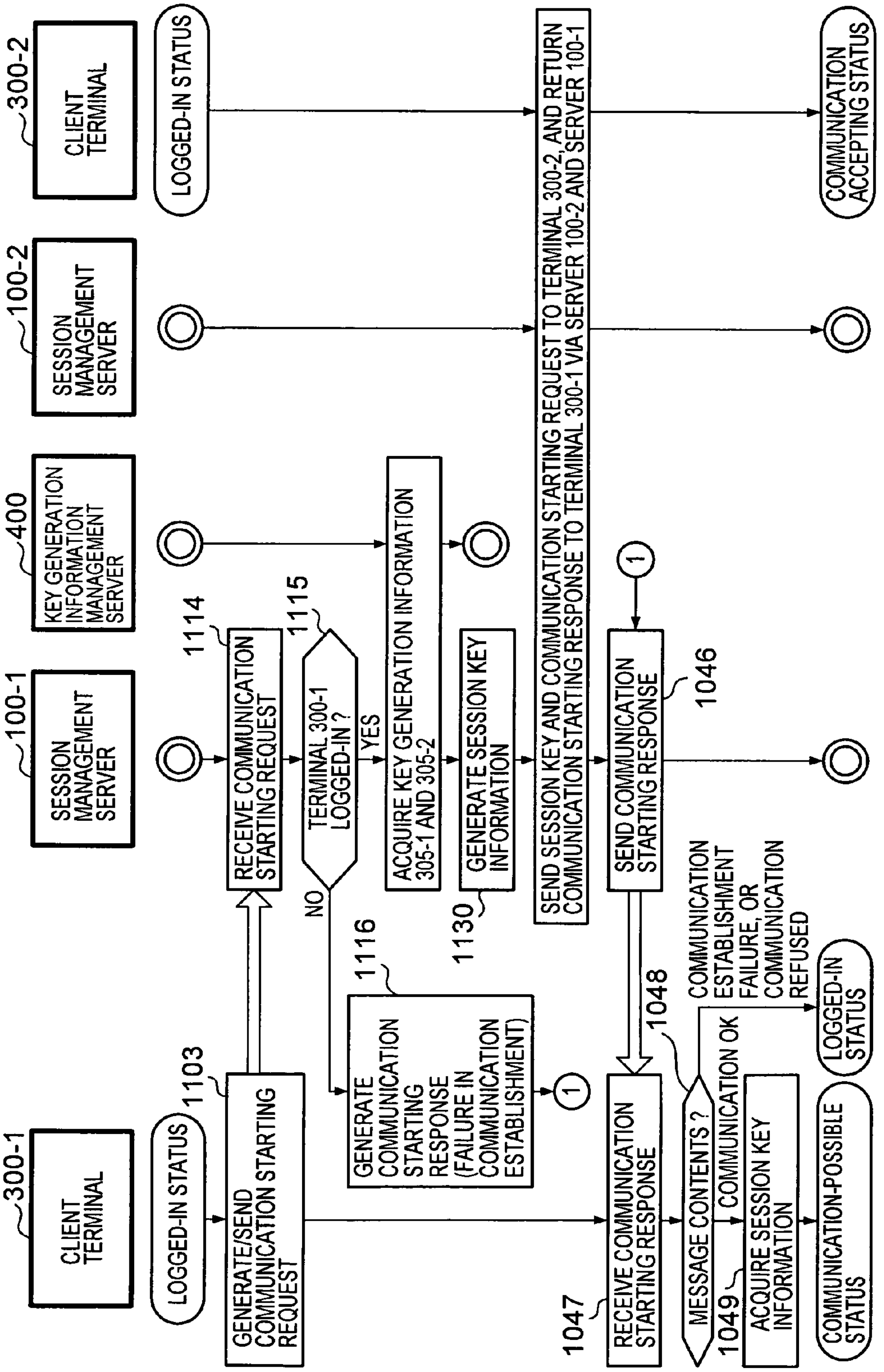
FIG. 13 exemplifies the entire sequence of a session establishing processing in Embodiment 2.
Figure 14:
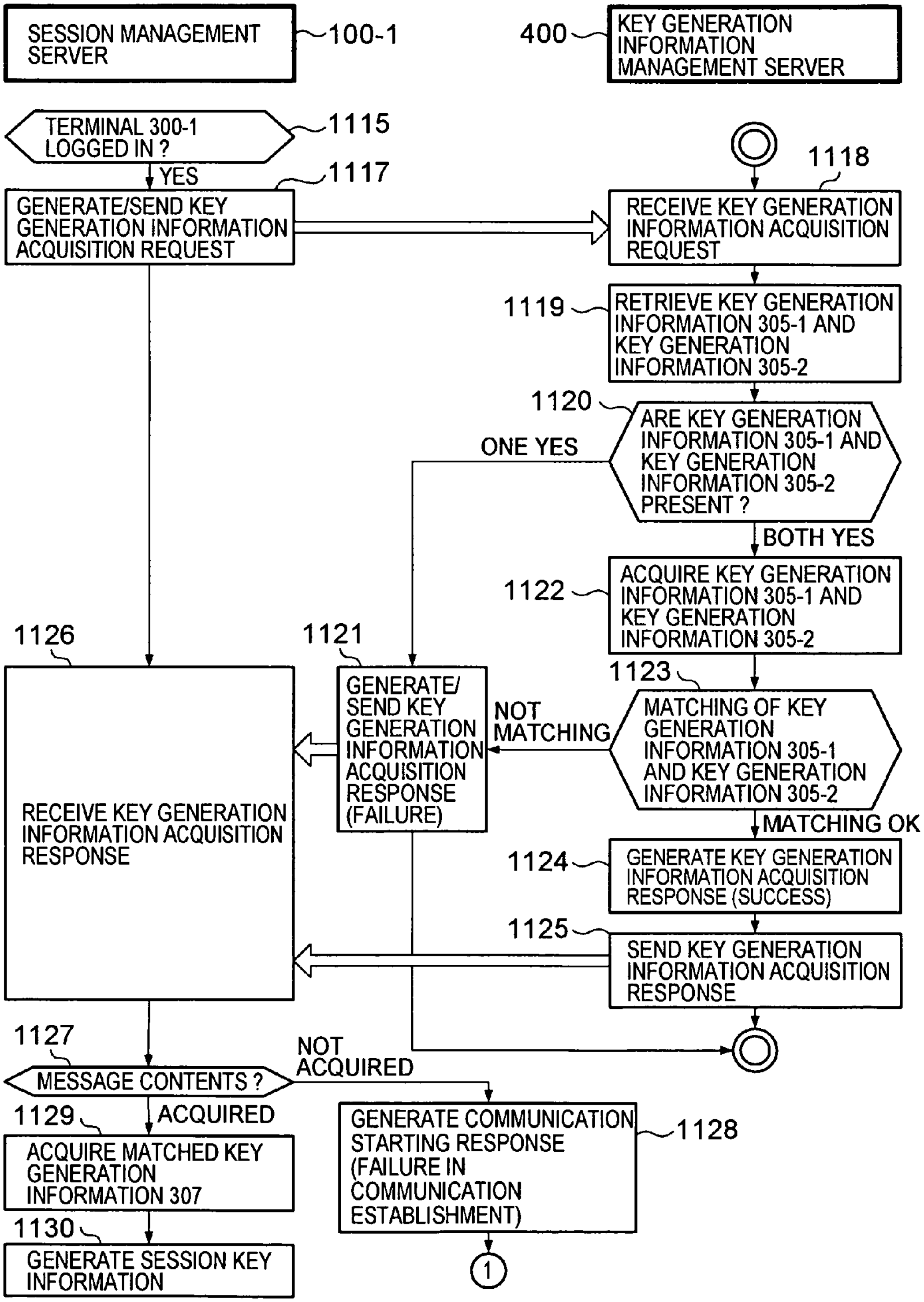
FIG. 14 exemplifies an operation sequence of acquisition processing of key generation information 305-1 of a terminal 300-1 and key generation information 305-2 of a terminal 300-2 in Embodiment 2.

The operations of Step 1113 to Step 1116 in FIG. 13 are identical to those of Step 1008 to Step 1011, respectively, and their description is omitted.

At Step 1115 of FIG. 13, in cases where the terminal 300-1 was logged in the session management server 100-1, the key generation information send/receive function 106 of the session management server 100-1 generates the key generation information acquisition request 4000, and sends it to the key generation information management server 400 (at Step 1117). Here in Embodiment 2, the ID 304-1 of terminal 300-1 and the ID 304-2 of the terminal 300-2 are described in the request object ID field 4003 of the key generation information acquisition request 4000.

When the key generation information send/receive function 405 of the key generation information management server 400 receives the key generation information acquisition request 4000 from the session management server 100-1 (at Step 1118), the key generation information retrieve function 403 retrieves, on the basis of the ID 304-1 of the terminal 300-1 and the ID304-2 of the terminal 300-2 described in the request object ID field 4003 of the key generation information acquisition request 4000, the key generation information DB 401 concerning the key generation information 305-1 of the terminal 300-1 and the key generation information 305-2 of the terminal 300-2 (at Step 1119).

In cases where the key generation information retrieve function 403 of the key generation information management server 400 reveals that one of the key generation information 305-1 of the terminal 300-1 or the key generation information 305-2 is not in the key generation information DB 401 (at Step 1120), the key generation information send/receive function 405 of the key generation information management server 400 generates the key generation information acquisition failure message, and returns it as the key generation information acquisition response 4500 to the session management server 100-1 (at Step 1121).

In cases where both the key generation information 3O5-1 and the key generation information 305-2 are in the key generation information DB 401 at Step 1120, the key generation information acquire function 404 of the key generation information management server 400 acquires the key generation information 305-1 and the key generation information 305-2 from the key generation information DB 401 (at Step 1122). The matching function 406 matches the key generation information 305-1 and the key generation information 305-2 (at Step 1123).

In cases where the matching result reveals that no usable algorithm suite is present for the encryption communications between the terminal 300-1 and the terminal 300-2, the key generation information send/receive function 405 of the key generation information management server 400 generates the key generation information acquisition failure message, and returns it as the key generation information acquisition response 4500 to the session management server 100-1 (at Step 1121). In cases where the matching result reveals that usable algorithm suite is present for the encryption communications between the terminal 300-1 and the terminal 300-2, the matching function 406 of the key generation information management server 400 matches the key generation information 305-1 and the key generation information 305-2, and selects the algorithm suite to be used for the encryption communications thereby to generate the matched key generation information 307. The key generation information send/receive function 405 generates the key generation information acquisition success message describing the matched key generation information 307, in the key generation information field 4505 (at Step 1124), and returns the message as the key generation information acquisition response 4500 to the session management server 100-1 (at Step 1125). Here in Embodiment 2, the ID 304-1 of the terminal 300-1 and the ID 304-2 of the terminal 300-2 are described in the request object ID field 4503 of the key generation information acquisition response 4500.

The key generation information send/receive function 106 of the session management server 100-1 receives (at Step 1126) the key generation information acquisition response 4500 sent by the key generation information management server 400 at Step 1121 or Step 1125, and examines the content of the response 4500 (at Step 1127). In cases where the key generation information acquisition response 4500 is the key generation information acquisition failure message, the message send/receive function 109 generates the communication establishment failure message (at Step 1128), and executes the operation of Step 1046. In cases where the key generation information acquisition response 4500 is the key generation information acquisition success message, the session key generate function 110 generates, when it acquires the matched key generation information 307 described in the key generation information field 4505 of the key generation information acquisition response 4500 (at Step 1129), the session key information 5000 (at Step 1130) on the basis of the set value described in the matched key generation information 307.

After the session key generate function 110 of the session management server 100-1 generated the session key information 5000, the processing operations at and after the Step 1033 of Embodiment 1 are sequentially performed in the encryption communication system, so that the terminal 300-1 and the terminal 300-2 start the encryption communications while sharing the session key generated by the session key generate function 110 of the session management server 100-1.

What has been thus far described is the operation sequence of Embodiment 2, which shares the session key for the encryption communications between the terminal 300-1 and the terminal 300-2 through the session management server 100-1, the session management server 100-2 and the key generation information management server 400 thereby to start the encryption communications.

In Embodiment 2, the key generation information management server 400 matches the key generation information 305-1 of the terminal 300-1 and the key generation information 305-2 of the terminal 300-2, but another method can be adopted. After the key generation information management server 400 acquires the key generation information 305-1 of the terminal 300-1 and the key generation information 305-2 of the terminal 300-2, for example, the key generation information 305-1 and the key generation information 305-2 are sent to the session management server 100-1 or the session management server 100-2. After this, the session management server 100-1 or the session management server 100-2 receives the key generation information 305-1 and the key generation information 305-2, and the matching is performed on these pieces of information.

In cases where the session management server 100-2 is equipped with the session key generate function 110 and the session key describe function 111 as in Embodiment 1, the session management server 100-2 can also generate the session key information 5000 in Embodiment 2.

In cases where the key generation information management server 400 generates the session key information 5000, the new session key generate function, as belonging to the key generation information management server 400, generates the session key information 5000 after the Step 1123, in the presence of the algorithm suite which can be used in the encryption communications between the terminal 300-1 and the terminal 300-2. Then, the key generation information send/receive function 405 generates the key generation information acquisition success message having described the session key information 5000, and sends the message as the key generation information acquisition response 4500 to the session management server 100-1. After this, the processing operations at and after Step 1033 of Embodiment 1 are sequentially performed.

Even in cases where the session management server 100-1 or the key generation information management server 400 is newly provided with a random number generating function and in cases where the terminal 300-1 and the terminal 300-2 have the session key generate function 110, the terminal 300-1 and the terminal 300-2 can later share the session key.

The invention should not be limited to the aforementioned individual embodiments. Those skilled in the art could make various additions and modifications within the scope of the invention. For example, the foregoing individual embodiments could also be suitably combined.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. An encryption communication system for establishing encryption communication to be performed by a first terminal and a second terminal through first and second session management servers, comprising:

a key generation information management server for selecting an encryption algorithm suite to be used for the encryption communication established between the first terminal and the second terminal, wherein the first session management server includes:

a function acquiring a first key generation information which is composed of a plurality of set items needed to determine a set value for generating a session key to be used by its own terminal from the first terminal, and stores a set value candidate for each set item; and a function to send the first key generation information to the key generation information management server, wherein the second session management server includes:

a function acquiring a second key generation information which is composed of a plurality of set items needed to determine a set value for generating a session key to be used by its own terminal from the second terminal, and stores a set value candidate for each set item; and a function to send the second key generation information to the key generation information management server, and wherein the key generation information management server includes:

a key generation information receiving function to receive the first key generation information from the first session management server, and to receive the second key generation information from the second session management server;

a key generation information register function to register the first and second key generation information received; and a function to select the algorithm suite to be used in the encryption communication, on the basis of the first key generation information and the second key generation information received, in accordance with a predetermined policy, when a communication starting request is received from the first terminal to the second terminal, by the first session management server.

2. An encryption communication system according to claim 1, wherein the first session management server includes the key generation information management server, and wherein the first session management server includes a random number generate function to generate a random number necessary for generating a session key to be used for the encryption communication, on the basis of the selected algorithm suite.

3. An encryption communication system according to claim 2, wherein the first session management server includes a session key generate function to generate session key information containing the session key to be used for the encryption communication, on the basis of the selected algorithm suite and the generated random number.

4. An encryption communication system according to claim 3, wherein the first session management server includes a session key describe function to contain the generated session key information in a communication starting request, from the first terminal to the second terminal, to send to the second session management server, and in a communication starting response from the first session management server to the first terminal, wherein the second session management server includes a function to receive the communication starting request containing the session key information, from the first session management server, and to send to the second terminal, wherein the second terminal includes a session key extract function to receive the communication starting request including the session key information, from the second session management server, and to acquire the session key information, and wherein the first terminal includes a session key extract function to receive the communication starting response containing the session key information, from the first session management server, and to acquire the session key information.

5. An encryption communication system according to claim 2, wherein the first session management server includes a session key describe function to contain the session key information composed of the selected algorithm suite and the generated random number, in the communication starting request from the first terminal to the second terminal and the communication starting response from the first session management server to the first terminal, wherein the second terminal includes:

a session key extract function to acquire the session key information transmitted together with the communication starting request; and a function to generate the session key on the basis of the algorithm suite contained in the session key information and the random number, and wherein the first terminal includes:

a session key extract function to acquire the session key information transmitted together with the communication starting response; and a function to generate the session key on the basis of the algorithm suite contained in the session key information and the random number.

6. An encryption communication system according to claim 1, wherein the key generation information management server includes a function to send the selected algorithm suite to the first session management server.

7. An encryption communication system according to claim 6, wherein the first session management server includes:

a function to receive the selected algorithm suite from the key generation information management server; and a random number generate function to generate a random number necessary for generating the session key to be used for the encryption communication, on the basis of the selected encryption algorithm suite.

8. An encryption communication system according to claim 7, wherein the first session management server includes a session key generate function to generate session key information containing the session key to be used for the encryption communication, on the basis of the selected algorithm suite and the generated random number.

9. An encryption communication system according to claim 8, wherein the first session management server includes a session key describe function to contain the generated session key information in a communication starting request, from the first terminal to the second terminal, to send to the second session management server, and in a communication starting response from the first session management server to the first terminal, wherein the second session management server includes a function to receive the communication starting request containing the session key information, from the first session management server, and to send to the second terminal, wherein the second terminal includes a session key extract function to receive the communication starting request including the session key information, from the second session management server, and to acquire the session key information, and wherein the first terminal includes a session key extract function to receive the communication starting response containing the session key information, from the first session management server, and to acquire the session key information.

10. An encryption communication system according to claim 7, wherein the first session management server includes a session key describe function to contain the session key information composed of the generated random number and the selected algorithm suite, in the communication starting request from the first terminal to the second terminal and the communication starting response from the first session management server to the first terminal, wherein the second terminal includes:

a session key extract function to acquire the session key information transmitted together with the communication starting request; and a function to generate the session key on the basis of the algorithm suite contained in the session key information and the random number, and wherein the first terminal includes:

a session key extract function to acquire the session key information transmitted together with the communication starting response; and a function to generate the session key on the basis of the algorithm suite contained in the session key information and the random number.

11. An encryption communication system according to claim 1, wherein the key generation information management server includes a random number generate function to generate a random number necessary for generating the session key to be used for the encryption communication, on the basis of the selected algorithm suite.

12. An encryption communication system according to claim 11, wherein the key generation information management server includes a function to send the generated random number and the selected algorithm suite to the first session management server.

13. An encryption communication system according to claim 12, wherein the first session management server includes a session key generate function to generate session key information containing the session key to be used for the encryption communication, on the basis of the selected algorithm suite and the generated random number received from the key generation information management server.

14. An encryption communication system according to claim 13, wherein the first session management server includes a session key describe function to contain the generated session key information in a communication starting request, from the first terminal to the second terminal, to send to the second session management server, and in a communication starting response from the first session management server to the first terminal, wherein the second session management server includes a function to receive the communication starting request containing the session key information, from the first session management server, and to send to the second terminal, wherein the second terminal includes a session key extract function to receive the communication starting request including the session key information, from the second session management server, and to acquire the session key information, and wherein the first terminal includes a session key extract function to receive the communication starting response containing the session key information from the first session management server, and to acquire the session key information.

15. An encryption communication system according to claim 12, wherein the first session management server includes a session key describe function to contain the session key information composed of the generated random number and the selected algorithm suite, in the communication starting request from the first terminal to the second terminal and the communication starting response from the first session management server to the first terminal, wherein the second terminal includes:

a session key extract function to acquire the session key information transmitted together with the communication starting request; and a function to generate the session key on the basis of the algorithm suite contained in the session key information and the random number, and wherein the first terminal includes:

a session key extract function to acquire the session key information transmitted together with the communication starting response; and a function to generate the session key on the basis of the algorithm suite contained in the session key information and the random number.

* * * * *